(12) United States Patent
Notoya et al.

(10) Patent No.: US 8,194,751 B2
(45) Date of Patent: Jun. 5, 2012

(54) MOVING PICTURE CODING METHOD AND MOVING PICTURE DECODING METHOD

(75) Inventors: Youji Notoya, Neyagawa (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1003 days.

(21) Appl. No.: 10/777,063

(22) Filed: Feb. 13, 2004

(65) Prior Publication Data

US 2004/0161033 A1 Aug. 19, 2004

(30) Foreign Application Priority Data

Feb. 19, 2003 (JP) .................................. 2003-040805

(51) Int. Cl.
*H04N 7/12* (2006.01)
*H04N 11/02* (2006.01)
*H04N 11/04* (2006.01)

(52) U.S. Cl. ......... 375/240.25; 375/240.01; 375/240.24; 375/240.26

(58) Field of Classification Search ............. 375/240.01, 375/240.24, 240.25, 240.26
See application file for complete search history.

(56) References Cited

U.S. PATENT DOCUMENTS

| | | | | |
|---|---|---|---|---|
| 5,621,464 A * | 4/1997 | Teo et al. | .................... | 348/390.1 |
| 5,859,660 A * | 1/1999 | Perkins et al. | .................. | 725/32 |
| 6,148,140 A * | 11/2000 | Okada et al. | .................. | 386/241 |
| 6,192,154 B1 * | 2/2001 | Rajagopalan et al. | ........ | 382/232 |
| 6,278,735 B1 * | 8/2001 | Mohsenian | ................... | 375/240 |
| 6,289,129 B1 * | 9/2001 | Chen et al. | .................... | 382/232 |
| 6,415,055 B1 * | 7/2002 | Kato | ............................. | 382/236 |
| 6,658,157 B1 | 12/2003 | Satoh et al. | | |
| 6,710,785 B1 * | 3/2004 | Asai et al. | ..................... | 715/723 |
| 7,096,488 B1 * | 8/2006 | Zhang et al. | .................. | 725/105 |
| 7,289,564 B2 * | 10/2007 | Chang | ...................... | 375/240.13 |
| 2002/0113898 A1 * | 8/2002 | Mitsuhashi | .................. | 348/578 |
| 2003/0138043 A1 * | 7/2003 | Hannuksela | ............. | 375/240.08 |
| 2004/0161033 A1 * | 8/2004 | Notoya et al. | ........... | 375/240.01 |
| 2004/0218816 A1 * | 11/2004 | Hannuksela | .................. | 382/232 |

FOREIGN PATENT DOCUMENTS

| | | |
|---|---|---|
| EP | 0 971 543 | 1/2000 |
| JP | 08-265693 | 10/1996 |
| JP | 08-265694 | 10/1996 |
| JP | 11-75156 | 3/1999 |
| JP | 2000-232435 | 8/2000 |

(Continued)

OTHER PUBLICATIONS

"Text of Final Committee Draft of Joint Video Specification (ITU-T REC. H.264 /ISO/IEC 14496-10 AVC)", International Organization for Standardization—Organization Internationale De Normalisation, Jul. 2002, pp. I-XV, 1, XP001100641.

(Continued)

*Primary Examiner* — Christopher S Kelley
*Assistant Examiner* — Chikaodili E Anyikire
(74) *Attorney, Agent, or Firm* — Wenderoth, Lind & Ponack, L.L.P.

(57) ABSTRACT

The moving picture coding apparatus includes: a flag information generation unit for generating a flag indicating that values indicated by display order information POC are in non-sequential order; and a variable length coding unit for performing variable length coding and other operations on the inputted coded signal and further generating a coded stream (Str) by including information such as the flag generated by the flag information generation unit.

9 Claims, 34 Drawing Sheets

FOREIGN PATENT DOCUMENTS

| | | |
|---|---|---|
| JP | 2000-236547 | 8/2000 |
| JP | 2000-287172 | 10/2000 |
| JP | 2000-295567 | 10/2000 |
| JP | 2001-76473 | 3/2001 |
| JP | 2002-300526 | 10/2002 |
| JP | 2002-300585 | 10/2002 |
| JP | 2003-143607 | 5/2003 |

OTHER PUBLICATIONS

Ward, C., et al., "Seamless Splicing for MPEG-2 Transport Stream Video Servers", SMPTE Journal, SMPTE INC., Scarsdale, NY, US, vol. 108, No. 12, Dec. 1999, pp. 878-879, XP000894173.

Summons to Attend Oral Proceedings issued May 9, 2011 in corresponding European Patent Application No. 04003609.7.

"Study of Final Committee Draft of Joint Video Specification (ITU-T Rec.H.264 ISO/IEC 14496-10 AVC)", ITU Study Group 16—Video Coding Experts Group—ISO/IEC MPEG & ITU-T VCEG (ISO/IEC JTC1/SC29/WG11 and ITU-T SG16 Q6), XX, XX, No. JVT-F100, Dec. 13, 2002, XP030005665.

\* cited by examiner

FIG. 13
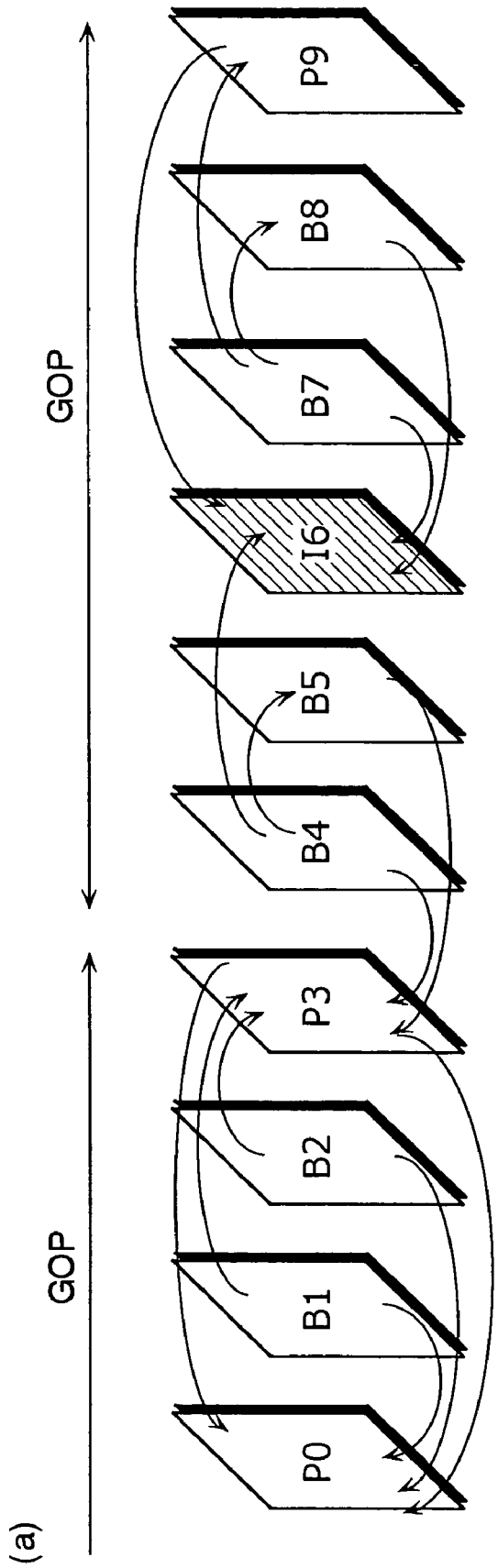
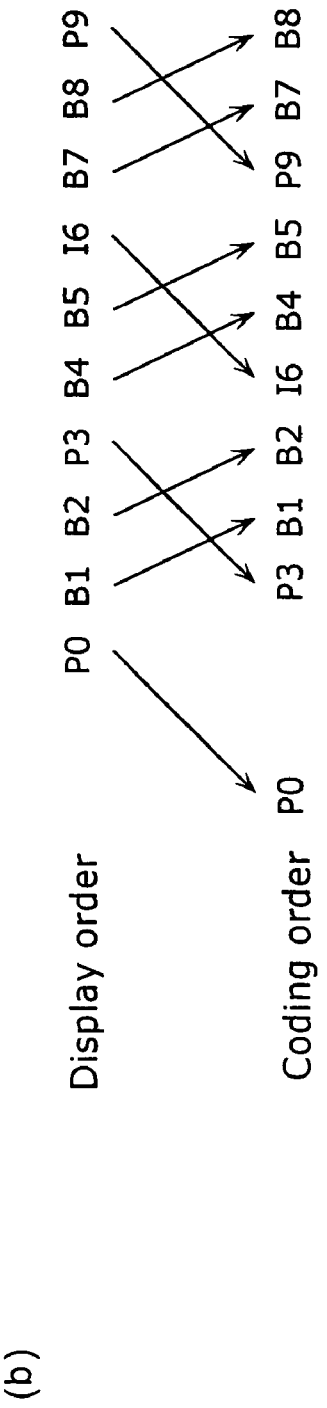

Fig. 30
(a)
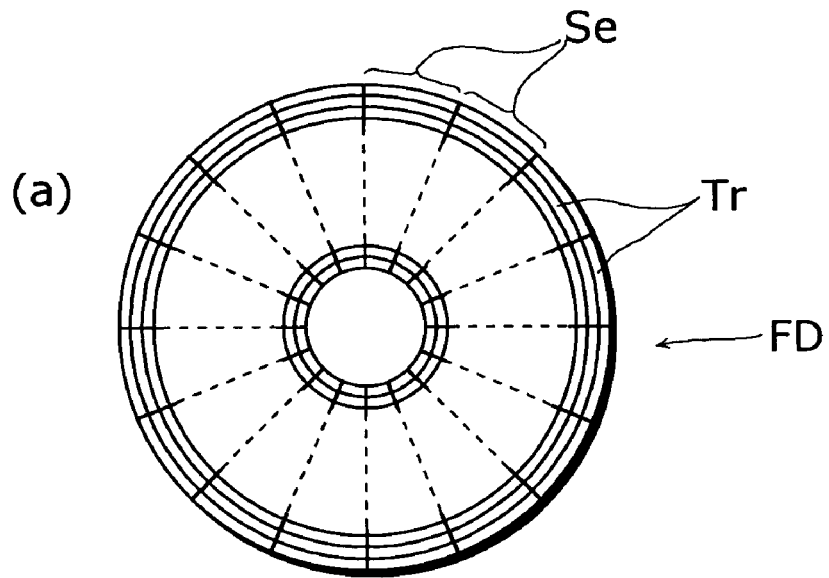
(b)
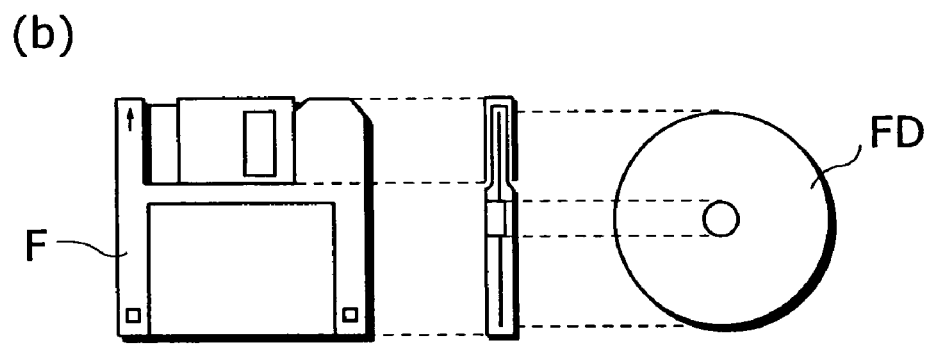
(c)
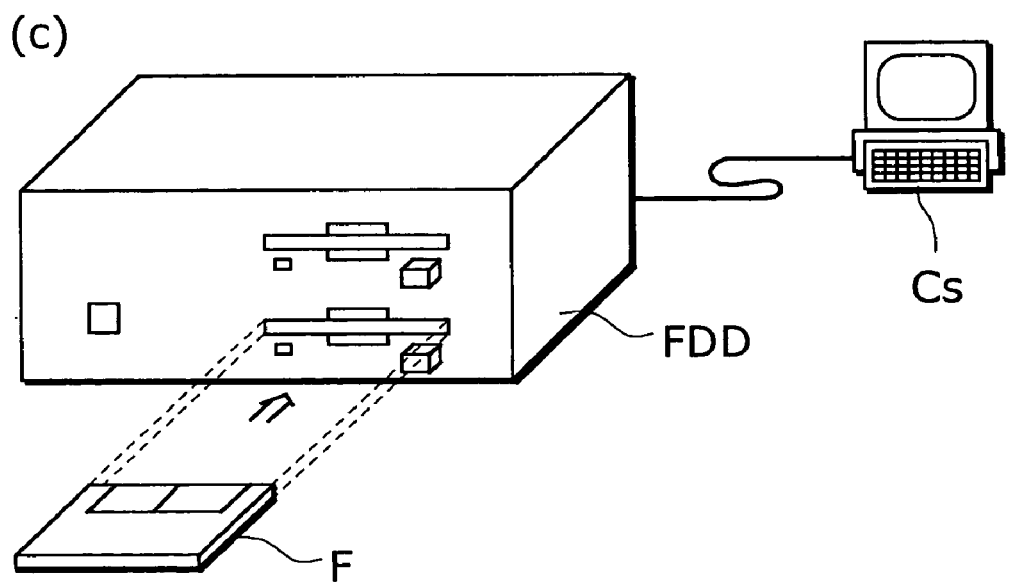

MOVING PICTURE CODING METHOD AND MOVING PICTURE DECODING METHOD

BACKGROUND OF THE INVENTION (1) Field of the Invention

The present invention relates to a moving picture coding method for coding a moving picture signal on a picture-by-picture basis, a moving picture decoding method for decoding the coded moving picture signal, and a program for executing these methods as software.

(2) Description of the Related Art

Recently, with an arrival of the age of multimedia which handles integrally audio, video and pixel values, existing information media, i.e., newspaper, journal, TV, radio and telephone and other means through which information is conveyed to people, has come under the scope of multimedia. In general, multimedia refers to a representation in which not only characters but also graphic symbols, audio and especially pictures and the like are related to each other. However, in order to include the aforementioned existing information media in the scope of multimedia, it appears as a prerequisite to represent such information in digital form.

However, when estimating the amount of information contained in each of the aforementioned information media in digital form, the information amount per character requires 1~2 bytes whereas audio requires more than 64 Kbits per second (telephone quality) and when it comes to a moving picture, it requires more than 100 Mbits per second (present television reception quality). Therefore, it is not realistic to handle the vast information directly in digital form via the information media mentioned above. For example, a videophone has already been put into practical use via Integrated Services Digital Network (ISDN) with a transmission rate of 64 Kbits/s~1.5 Mbits/s, however, it is impossible to transmit a picture captured on the TV screen or shot by a TV camera.

This therefore requires information compression techniques, and for instance, in the case of a videophone, video compression techniques compliant with H.261 and H.263 Standards recommended by International Telecommunication Union-Telecommunication Standardization Sector (ITU-T) are employed. According to the information compression techniques compliant with MPEG-1 standard, picture information as well as audio information can be stored in an ordinary music CD (Compact Disc).

Here, Moving Picture Experts Group (MPEG) is an international standard for a compression of moving picture signals and the MPEG-1 is a standard that compresses video signals down to 1.5 Mbit/s, namely, to compress the information included in TV signals approximately down to a hundredth. The quality targeted in the MPEG-1 standard was a medium one so as to realize a transmission rate primarily of about 1.5 Mbits/s, therefore, MPEG-2, standardized with the view to meet the requirements of even higher quality picture, realizes a TV broadcast quality for transmitting moving picture signals at a transmission rate of 2~15 Mbits/s. In the present circumstances, a working group (ISO/IEC JTC1/SC29/WG11) previously in charge of the standardization of the MPEG-1/MPEG-2 has further standardized MPEG-4 which achieves a compression rate superior to the one achieved by the MPEG-1/MPEG-2, allows coding/decoding operations on a per-object basis and realizes a new function required by the age of multi media. At first, in the process of the standardization of the MPEG-4, the aim was to standardize a low bit rate coding, however, the aim is presently extended to a more versatile coding including a high bit rate coding for interlaced pictures and others. Moreover, a standardization of MPEG-4 AVC and ITU H.264, as a next generation coding method, is in process with a higher compression rate, jointly worked by the ITU-T and the ISO/IEC. The next generation coding method is published under the name of Committee Draft (CD) as of August 2002 (see reference, for example, to ISO/IEC 14496-10 Editor's Proposed Changes Relative to JVT-E146d37ncm, revision 4, 2002-12).

In general, in coding of a moving picture, compression of information volume is performed by eliminating redundancy both in spatial and temporal directions. Therefore, an inter-picture prediction coding, which aims at reducing the temporal redundancy, estimates a motion and generates a predictive picture on a block-by-block basis with reference to forward and backward pictures, and then codes a differential value between the obtained predictive picture and a current picture to be coded. Here, "picture" is a term to represent a single screen and it represents a frame when used for a progressive picture whereas it represents a frame or a field when used for an interlaced picture. The interlaced picture here is a picture in which a single frame consists of two fields respectively having different time. For coding and decoding an interlaced picture, three ways are possible: processing a single frame either as a frame, as two fields or as a frame/field structure depending on a block in the frame.

A picture to which an intra-picture prediction coding is performed without reference pictures is called an "I-picture". A picture to which the inter-picture prediction coding is performed with reference to a single picture is called a "P-picture". A picture to which the inter-picture prediction coding is performed by referring simultaneously to two pictures is called a "B-picture". The B-picture can refer to two pictures, arbitrarily selected from the pictures whose display time is either forward or backward to that of a current picture to be coded, as an arbitrary combination. The reference pictures can be specified for each block which is a basic unit for coding and decoding, but they can be classified as follows: the first reference picture for a reference picture that is described first in the bit stream on which coding is performed; and the second reference picture for a picture that is described later. However, the reference pictures need to be already coded or decoded as a condition to code or decode these I, P and B pictures.

A motion compensation inter-picture prediction coding is employed for coding P-pictures or B-pictures. The motion compensation inter-picture prediction coding is a coding method in which motion compensation is applied to inter-picture prediction coding. The motion compensation is not a method to simply predict motions using pixels in the reference picture but to estimate a motion (to be referred to as a "motion vector" hereinafter) at each part within a picture and improve accuracy in prediction by performing prediction that takes a motion vector into consideration as well as to reduce the data amount. For example, the amount of data is reduced by estimating a motion vector for a current picture to be coded and coding prediction error between a predictive value, which is obtained after being shifted for the amount equivalent to the motion vector, and the current picture. In the case of using this method, information on motion vectors is required at the time of decoding, therefore, the motion vectors are coded and then recorded or transmitted.

The motion vector is estimated on a macroblock-by-macroblock basis. To be precise, the motion vector is estimated by fixing a macroblock in the current picture, shifting a macroblock in the reference picture within a search range and then finding out a location of the reference block that resembles a basic block the most.

FIG. 1 is a block diagram showing the structure of the conventional moving picture coding apparatus.

The moving picture coding apparatus is composed of a motion estimation unit 103, a subtracter 104, a coding unit 105, a motion compensation unit 106, a variable length coding unit 107, a decoding unit 108, an adder 109 and memories 110, 111.

The moving picture signal Vin is inputted to the subtracter 104 and the motion estimation unit 103.

The motion estimation unit 103 uses decoded picture data which is already coded and read out from the memory 110 as a reference picture, estimates a motion vector MV indicating a location predicted as optimal in a search range within the reference picture, and outputs it to the motion compensation unit 106.

The motion compensation unit 106 generates a motion compensated image signal MCRef using the motion vector MV estimated by the motion estimation unit 103 and outputs it to the subtracter 104 and the adder 109.

The subtracter 104 calculates a differential between the inputted moving picture signal Vin and the motion compensated image signal MCRef inputted from the motion compensation unit 106 and outputs a differential signal Dif to the coding unit 105.

The coding unit 105 performs coding processing such as frequency transformation, quantization, and others on the inputted differential signal Dif, generates a coded signal and outputs it to the variable length coding unit 107 and the decoding unit 108. The variable length coding unit 107 performs variable length coding or the like on the inputted coded signal, further generates a coded stream Str by adding the motion vector MV inputted from the motion compensation unit 106, or the like, and outputs it outside the moving picture coding apparatus.

The decoding unit 108 performs decoding processing such as inverse quantization, inverse frequency transformation and others on the inputted coded signal and outputs the decoded differential signal RecDif to the adder 109.

The adder 109 adds the differential signal RecDif inputted from the decoding unit 108 and the picture signal RecMCRef inputted from the motion compensation unit 106 and generates a decoded local picture LocalRecon. The generated decoded local picture is outputted to the memory 111.

The decoded local picture LocalRecon is a picture which corresponds to the result of decoding operated by a moving picture decoding apparatus and is used as a reference picture when the moving picture signal Vin to be coded next in coding order is coded. Therefore, either the decoded local picture LocalRecon written in the memory 111 is copied in the memory 110 by the time when the following moving picture signal Vin is inputted or the contents are exchanged between the memories 110 and 111.

FIG. 2 shows concepts of display order information (Picture Order Count: POC) and a frame number (Frame Number: FN) defined in JVT. The display order information POC indicates an order in which the pictures are displayed. However, it does not indicate an actual display time. For example, the display order information POC of a picture IDR19 in the diagram indicates "0" while the POC of the following picture B20 indicates "1". This shows that the picture B20 is to be displayed following the picture IDR19 but does not show the period of time that passes until the picture is displayed. The actual display time can be obtained from data associated with each of the pictures and is managed by an apparatus which functions independently from a video decoder (a moving picture decoding apparatus). The display order information POC is always reset to "0" at an IDR picture, a special intra picture, and is assigned to each of the pictures so that the value increases picture by picture in display order. The POC is reset again to "0" when the value reaches to a predetermined maximum value. The example in the diagram shows that the display order information POC returns to the value "0" at IDR pictures IDR19, IDR29, and also at the picture B24 after having completed the cycle, when the maximum value of the display order information POC is set to "4".

The FN is the numbers to be assigned to the pictures which may be referred to later on. (A) in the diagram shows a state of the memory before the picture B21 is decoded, where three reference pictures are stored. (B) in the diagram shows the state after the picture B21 is decoded and stored in the memory. Here, the FN of the picture B21 has the same value as that of a picture P25 which is to be decoded next. However, when plural consecutive pictures in decoding order have the same FN, this means that the last picture but not the other pictures in decoding order is a reference picture. According to this example, the picture B21 is not a reference picture, therefore, when being stored in the memory, the picture B21 is marked as "unused as a reference picture" (the state of being marked is presented as "unused"). When a reference picture is stored in the memory, it is marked as "used as a reference picture" (the state of being marked is presented as "used"). It should be noted that only the "unused" mark is indicated in the diagram. Whether or not a picture is a reference picture is indicated in a field called "$nal_{13}\ ref_{13}\ idc$" included in the coded stream, however, this is not explained here since it does not relate directly to the description of the present invention. The frame number FN is also reset to "0" at IDR pictures as well as when the value reaches the predetermined maximum value, as is the case of the display order information POC. The example shows that the FN is reset to "0" at the pictures IDR19 and IDR29 as well as at the picture B24.

Next, the operation of removing pictures with the view to allocate a free space in the memory is explained with reference to FIGS. 3 and 4. FIG. 3 shows the removing operation in the case where the memory has the picture marked as "unused". The decoded pictures IDR19, P22, B20 and B21 are stored in the memory immediately before the picture P23 is decoded while the picture B20 is already marked as "unused" since it is not a reference picture (see (A) in the diagram). Then, the pictures are marked as "unused", if necessary, using a method such as a memory management control operation (MMCO) or a sliding window which determines a picture, which is stored in the memory at the earliest time, as unnecessary. These operations are called unused marking processing in the present specification. Here, the picture P22 is marked as "unused" (see reference to (B) in the diagram). Then, a picture is removed in order to allocate a free space. When plural used pictures are stored in the memory as shown in (B), the picture located in the earliest position in display order (POC) is removed. In this case, the display order information of the picture P22 indicates "3" while the display order information of the picture B20 indicates "1", therefore, the picture B20 is removed (see reference to (C) in the diagram). The picture P23 is stored in the area released as a result of the removing (see reference to (D) in the diagram).

It should be noted that a picture includes a frame and a field. Although the term "picture" is employed in the present specification, a picture may be stored in the memory on a frame-by-frame basis (an odd field and an even field of the same time). Similarly, a picture may be removed on a frame-by-frame basis for allocating a free space in the memory.

It should be also noted that the number presented with the term "stage" in the diagram indicates a stage of transition of the memory. The stage 1 is a stage before the unused marking processing is operated in processing the picture (a picture P23 in this case) and the stage 2 is a stage after the unused marking processing is operated while the stage 3 is a stage after a free space is allocated and the stage 4 is a stage after the picture (P23) is stored.

FIG. 4 shows the removing operation when the memory does not have the picture marked as "unused". As shown in the diagram, the pictures are decoded in order as follows: ID19, P22, B20, B21 and P23. As shown in (A) in the diagram, the pictures IDR19, P22, B20 and B21 are stored in the memory at the stage before the picture P23 is decoded and any of these pictures is not marked as "unused". Then, as shown in (B) in the diagram, it is assumed that any of the pictures are not marked as "unused" in the unused marking processing. As in this case, when the memory has no such pictures marked as "unused", the picture firstly decoded out of all the pictures stored in the memory is removed in order to allocate a free space. As shown in (C) in the diagram, the picture IDR19 is removed here since it is the picture firstly decoded among the pictures stored in the memory. Lastly, as shown in (D) in the diagram, the decoded picture P23 is stored in the released area.

FIG. 5 is a block diagram showing the structure of the conventional moving picture decoding apparatus.

The moving picture decoding apparatus is composed of a variable length decoding unit 402, a picture decoding unit 202, an MMCO decoding unit 204, a memory 206 and a memory management unit 401.

The variable length decoding unit 402 performs variable length decoding on the inputted coded moving picture signal Str while the picture decoding unit 202 decodes the coded picture data comp_pic and stores a decoded picture signal Recon in the memory 206. The picture decoding unit 202 outputs motion information MV to the memory 206, generates a motion compensated reference picture MCPic and performs motion compensation in decoding a picture that is inter-picture predictive coded. The memory management unit 401 outputs instructions mctrl for managing the memory such as determination of an area for storing a picture, retention of a free space, and others. The display order information POC is outputted from the variable length decoding unit 402 to the memory management unit 401 and is kept there. An MMCO command MMCO, which is one of the unused marking processing as mentioned above, is inputted from the variable length decoding unit 402 to the MMCO decoding unit 204, and decoded while the instruction to mark "unused" is inputted to the memory management unit 401. A decoded picture signal Vout to be displayed is outputted from the memory 206.

FIG. 6 is a flowchart showing the memory-related operation performed by the conventional moving picture decoding apparatus.

The present flow shows the operation on a picture-by-picture basis in Steps S1 through S2. The moving picture decoding apparatus performs unused marking processing and marks "unused", if necessary, for each of the pictures stored in the memory (Step S13). The moving picture decoding apparatus then performs processing of allocating a free space, allocates a free space in the memory (Step S14) and stores the decoded picture signal Vout in the free space (Step S15).

FIG. 7 is a flowchart showing the operation for allocating a free space performed by the conventional moving picture decoding apparatus and explaining in detail Step S14 in FIG. 6. In the processing of allocating a free space (Step S14), the moving picture decoding apparatus examines whether or not the memory 206 has the picture marked as "unused" (Step S141). When the memory 206 has such picture, a picture, which is displayed at the earliest time among the pictures marked as "unused" stored in the memory 206, is removed (Step S143). When the memory 206 does not have any such pictures, the picture that is firstly decoded among the pictures stored in the memory 206 is removed (Step S142).

FIG. 9 is a conceptual diagram describing the operation of invalid picture processing. The JVT defines the operation of the memory management that when a part of the sequence of pictures inputted by the moving picture decoding apparatus is lost, invalid pictures are inserted for the number corresponding to the lost pictures. This operation is performed by the moving picture decoding apparatus when "required_frame_num_update_behaviour_flag" included in the sequence parameter set indicates "1". The invalid picture is a specially marked picture without having an actual decoded picture signal, and cannot be used for reference. It is assumed that the status of the memory after having decoded the pictures I19, P20, P22 and P23 is as shown in (A) of the diagram. When coding the following picture B24, a reference index used for specifying a reference picture is assigned in such manner that a small value of the reference index ref_idx is assigned to the picture that is decoded at the latest time in decoding order and not marked as "unused". The assignment of the reference index as described above is only an example and the way of assigning differs depending on a picture type or the like while the dependent nature of assigning the index of reference relations with dependency on the pictures stored in the memory is the same. In the example shown in the diagram, "ref_idx=0" is assigned to the picture P22 which is decoded lastly and is not marked "unused" while "ref_idx=1" is assigned to the picture P21 which is decoded immediately before the picture P22 and is not marked as "unused".

Here, when the pictures P21 and P23 are lost during the transmission, or in other cases, and are not inputted in the decoder, the reference indices ref_idx are assigned to the reference pictures, as shown in (B) in the diagram, for decoding the picture B24, unless the invalid pictures are inserted. Basically, "ref_idx=0" and "ref_idx=2" are respectively assigned to the pictures P22 and P20 which are referred to by the picture B24. Since "ref_idx=0" is assigned to the picture P22 and "ref_idx=2" is assigned to the picture I19, it is a problem that the picture I19 instead of the picture P20 might be referred to by mistake. In order to avoid this, the invalid pictures are inserted.

(C) in the diagram shows a state of the memory before the picture B24 is decoded in the case in which the invalid pictures are inserted. When the non-sequentiality in frame numbers FN is detected, the invalid pictures are inserted for the number corresponding to the number of the lost pictures. In the example, when the picture P22 with the FN indicating "3" is decoded, the FN of the picture P20, which is decoded immediately before the picture P22, indicates "1". The number thus increases by 2 while it increases normally by 1, which shows that one picture is lost. Therefore, one invalid picture is inserted before the picture P22 is decoded. The invalid picture as described above being a special picture is marked as "used" although it does not have an actual decoded picture signal and is processed as a reference picture at the time of assigning the reference indices to the pictures. The invalid picture, however, is further marked as "non-existent (non-exist)" because it shall not be used actually for reference.

FIG. 10 is a block diagram showing the structure of the conventional moving picture decoding apparatus. The moving picture decoding apparatus includes an FN gap detection unit 211 and the memory management unit 412 operates differently, which are different from the moving picture decoding apparatus described in FIG. 5. The FN gap detection unit 211 obtains a frame number FN from the variable length decoding unit 411, and instructs the memory management unit 412 to insert the invalid pictures for the required number, when the gap is detected. The memory management unit 412 stores, in the memory 206, the invalid pictures for the number instructed by the FN gap detection unit 211.

FIG. 11 is a flowchart showing the invalid picture processing operated by the conventional moving picture decoding apparatus. The difference in the memory-related operation between the present moving picture decoding apparatus and the one described in FIG. 6 is that the former examines a gap between the frame numbers FN (Step S11) before the unused marking processing takes place (Step S13). When the gap is detected, the moving picture decoding apparatus proceeds to the unused marking processing (Step S13) after having stored the invalid pictures for the number corresponding to the number of the missing pictures. When the gap is not detected, the moving picture decoding apparatus proceeds directly to the unused marking processing (Step S13). In Step S12, the moving picture decoding apparatus stores the invalid pictures for the number of the missing pictures in the same manner as the normal procedure used in storing a picture shown in FIG. 6.

FIG. 13 is a conceptual diagram showing the conventional structure of the stream according to MPEG-2. As shown in the diagram, the stream according to MPEG-2 has a layered system. The stream is made up of a plurality of Group Of Pictures (GOP). It is possible to edit a moving picture and to perform random access on it by using the GOP as a basic unit used in coding processing. The Group Of Picture consists of a plurality of pictures, each being I-picture, P-picture and B-picture. The stream, GOP and picture respectively include a synchronous signal (sync) indicating a boundary between respective units and a header that is data commonly included in the respective units. In MPEG-2, P-picture can be predictively coded with reference to one picture, either I-picture or P-picture, whose display time immediately precedes that of the P-picture. B-picture can be predictively coded with reference to one picture whose display time immediately precedes the B-picture or one picture whose the display time immediately follows the B-picture, both of which can be either I-picture or P-picture. The position of the B-picture is arranged in the stream, either immediately after I-picture or P-picture. Therefore, at the time of performing random access, all the pictures which are located after I-picture can be decoded and displayed, when decoding starts from I-picture. Also, the degree of allowance for the reference structure has been limited since the memory can store, at maximum, two reference pictures.

FIG. 14 is a conceptual diagram showing the conventional moving picture coding method defined in the JVT. According to the JVT, it is possible to refer to an arbitrary distant picture as long as it does not go across the special IDR picture. Therefore, it is possible, for example, to code many pictures by rearranging the coding order with the view to enhance the coding efficiency. In the diagram, the correlativity among the pictures 19, 20, 21, 25, 26 and 27 is very strong as well as among the pictures 22, 23, 24, 28, 29 and 30. In this case, the coding efficiency can be improved by inter-picture coding firstly the pictures 19, 20, 21, 25, 26 and 27 (GOP1) and then the pictures 22, 23, 24, 28, 29 and 30 (GOP2).

FIG. 15 is a flowchart showing the operation performed in the conventional moving picture coding method defined in the JVT. According to the moving picture coding method defined in the JVT, all the uncoded pictures can be the candidate pictures for coding (Step S55). Then, a picture is selected from the candidate pictures for coding based on certain criteria (Step S56). For example, when the number of uncoded pictures is ten, all the ten pictures may be determined as candidate pictures for coding and the tenth picture in display order may be selected for coding. After the coding, when an uncoded picture is still found, the procedure returns to Step S55. In Step 56, another uncoded picture may be awaited for input instead of coding processing.

By the way, the conventional moving picture decoding apparatus including the moving picture decoding apparatus as such have been unable to edit a coded stream except for IDR pictures, that is, special intra pictures. The following describes this problem.

FIG. 8 is a conceptual diagram for explaining the problem that the non-sequentiality in the sequence generates a non-sequentiality in the display order information POC and thereby removes a picture which is not displayed yet. The diagram shows the case in which a sequence is decoded after having combined the two parts, Clip1 and Clip2. A place where the non-sequentiality in the sequence generated by such editing or for other reasons is called an editing point. In this example, the maximum value of the display order information POC is set so that the circulation of the values indicated by the display order information POC does not need to be considered. (A) in the diagram shows a state of the memory after the Clip1 is decoded and the memory stores the pictures I19, P22, B20 and B21. The respective display order information POC indicate "4", "7", "5" and "6" while it is assumed that the pictures I19, B20 and B21 are marked as "unused". (B) in the diagram shows a state of the memory after the first picture in the Clip2, I85, is decoded, but before the second picture P86 is decoded. Here, it is assumed that the picture I85 is stored in the position where the picture B20 has been stored. Subsequently, it is assumed that the picture I85 in the Clip2 is marked as "unused" in the unused marking processing (see (B) in the diagram). Then, in the following processing of allocating a free space, the picture I85 is removed since the picture located in the earliest position in display order is to be removed out of the pictures marked "unused". Here, assuming that an average number of pictures which are delayed for the display after the decoding is three, the pictures B21, P22 and I85 are not displayed yet. However, the picture I85 is removed in spite that it is not displayed yet.

FIG. 12 is a conceptual diagram for explaining a problem that the non-sequentiality in the sequence generates a non-sequentiality in the frame number FN and that an invalid picture removes the picture which is not displayed yet. The example shows how a sequence is decoded after having combined non-sequential parts Clip1 and Clip2. (A) in the diagram shows a state of the memory after the picture P25 is decoded and five pictures of the picture P21 through the picture P25 are stored. (B) in the diagram shows a state of the memory after the invalid picture is inserted when the first picture in the Clip2, I60, is decoded. The picture I60 has an FN indicating "12" while the picture P25, which is decoded immediately before the picture I60, has an FN indicating "5". It is therefore determined that six pictures are lost and six invalid pictures are inserted. In this case, all the pictures stored in the memory are removed, causing a problem that, for instance, in the state as shown in (A) of the diagram, the pictures P23, P24 and P25 are removed although they are not displayed yet.

FIG. 16 is a conceptual diagram for explaining a problem caused by the degree of allowance in the coding defined by the JVT at the time of editing or performing access random processing. (B) is in the diagram is an original stream that is same as the stream shown in FIG. 14. (A) in the diagram shows how the GOP2 is decoded without the GOP1. In this case, the pictures 25 through 27 cannot be replayed after replaying the pictures 22 through 24 since the pictures 25 through 27 have not been obtained, which causes a non-sequentiality in replay. This problem occurs when the GOP1 is removed as a result of editing or when performing random access starting from the GOP2, or in other cases. (C) in the diagram shows how the GOP1 is decoded without the GOP2. In this case, the non-sequentiality in replay is generated because the pictures 22 through 24 have not been obtained. This problem occurs when the GOP2 is removed as a result of editing.

SUMMARY OF THE INVENTION

The present invention is therefore conceived in view of above circumstances and aims to provide a moving picture coding method and a moving picture decoding method for allowing a moving picture to be edited at any place, not necessarily at IDR picture that is a special intra picture.

In order to achieve the above object, the moving picture coding method according to the present invention for coding a moving picture signal on a picture-by-picture basis and generating a coded stream, the method comprising: a flag information generation step of generating flag information indicating that a picture order is non-sequential; and an information insertion step of inserting the flag information into the coded stream.

Thus, it is possible to insert the information indicating that the order of pictures is non-sequential into the coded stream.

The moving picture coding method according to the present invention for coding a moving picture signal on a picture-by-picture basis and generating a coded stream, the method comprising a coding step of coding a picture in a manner in which the picture is included in a coding unit located after a predetermined coding unit, said picture whose position is later than a position of a first intra picture among pictures included in the predetermined coding unit in display order, said predetermined coding unit being made up of a plurality of pictures.

Thus, when the coding unit following the predetermined coding unit is decoded, it is possible to replay the pictures included in the coding unit following the predetermined coding unit, without generating a non-sequentiality in replay.

The moving picture decoding method according to the present invention for decoding a coded stream on a picture-by-picture basis, the method comprising: an information extraction step of extracting flag information indicating that a picture order is non-sequential; and a management step of managing an area for storing a decoded picture based on the flag information.

The flag information indicates that values indicated by display order information of the pictures are in non-sequential order, and in the management step, a picture whose position is the earliest in display order among decoded pictures stored in the area may be determined based on the display order information and the flag information, and the determined picture may be determined as a picture to be removed.

Thus, removing of the pictures which are not displayed yet caused by the non-sequentiality in the display order information of the pictures can be prevented.

The moving picture decoding method may further comprise an invalid picture storage step of storing an invalid picture in the area when values indicated by coding order information of the pictures are in non-sequential order, wherein the flag information indicates that the values indicated by the coding order information are in non-sequential order, in the management step, whether or not to store an invalid picture in the area is determined based on the flag information and the coding order information, and in the invalid picture storage step, an invalid picture is stored in the area based on a result of the determination made in the management step.

Thus, removing of the pictures which are not displayed yet, caused by the non-sequentiality in the coding order information of the pictures, can be prevented.

The present invention can be realized not only as the moving picture coding method and moving picture decoding method as described above, but also as a moving picture coding apparatus and a moving picture decoding apparatus having the characteristic steps included in the methods as units, and even as a program causing a computer to execute these steps. Needless to say, such program can be distributed through a recording medium like a CR-ROM or a transmission medium such as an Internet.

As is apparent from the above description, it is possible to edit a moving picture at any place, not necessarily at the IDR picture which is a special intra picture.

For further information about technical background to this application, Japanese Patent Application No. 2003-040805 filed on Feb. 19, 2003, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 13 is a conceptual diagram showing the conventional structure of the stream according to MPEG-2;

FIGS. 30A, 30B and 30C are illustrations of a recording medium for recording a program for realizing the moving picture coding method and the picture decoding method according to each of the above embodiments of the present invention in a computer system;

DESCRIPTION OF THE PREFERRED EMBODIMENT(S)

First Embodiment

Figure 17:
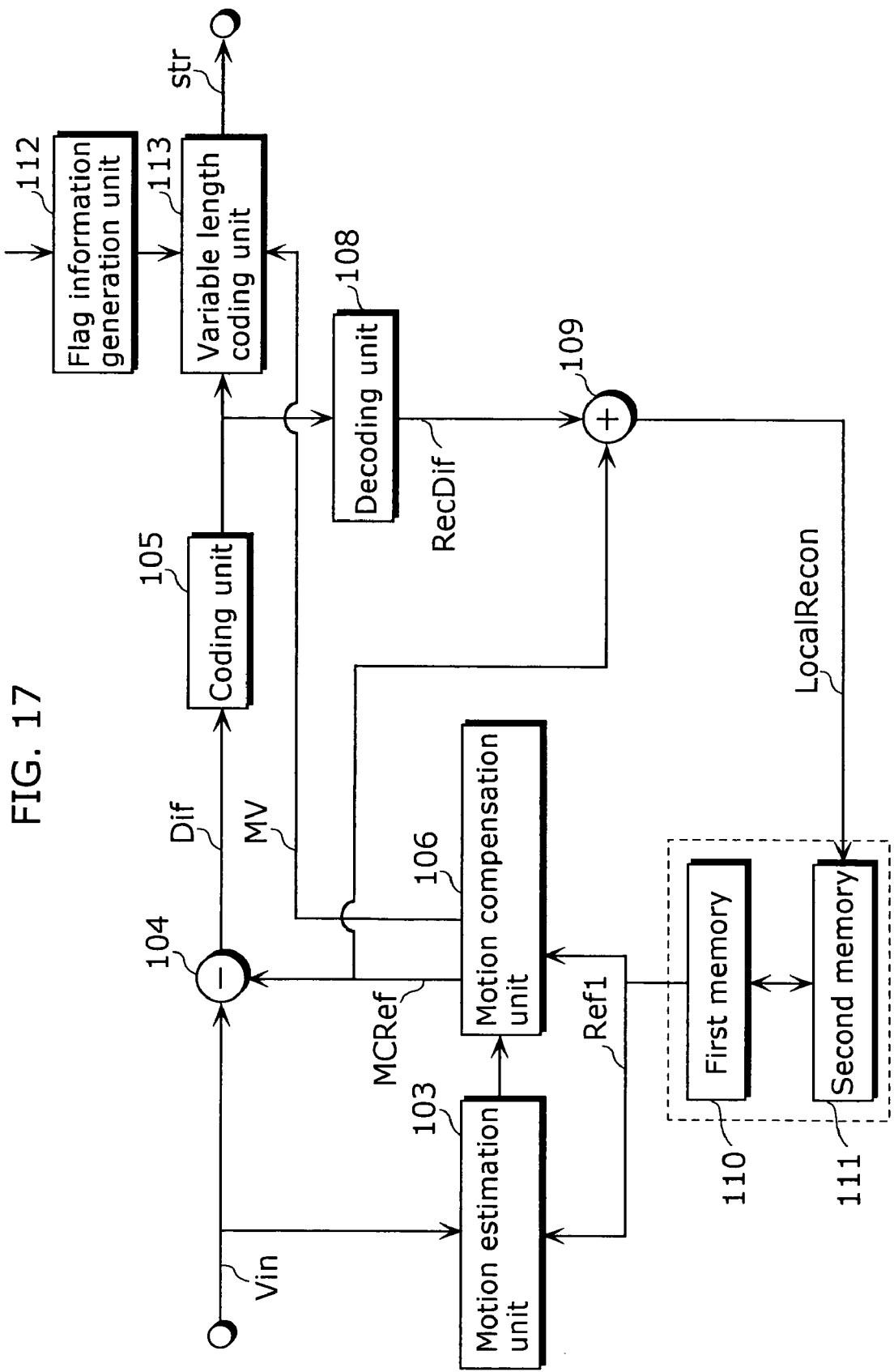
FIG. 17 is a block diagram showing the structure of the moving picture coding apparatus according to a first embodiment of the present invention.

FIG. 17 is a block diagram showing the structure of the moving picture coding apparatus according to the present invention.

The moving picture coding apparatus is composed of a motion estimation unit 103, a subtracter 104, a coding unit 105, a motion compensation unit 106, a variable length coding unit 113, a decoding unit 108, an adder 109, memories 110, 111 and a flag information generation unit 112.

Figure 1:
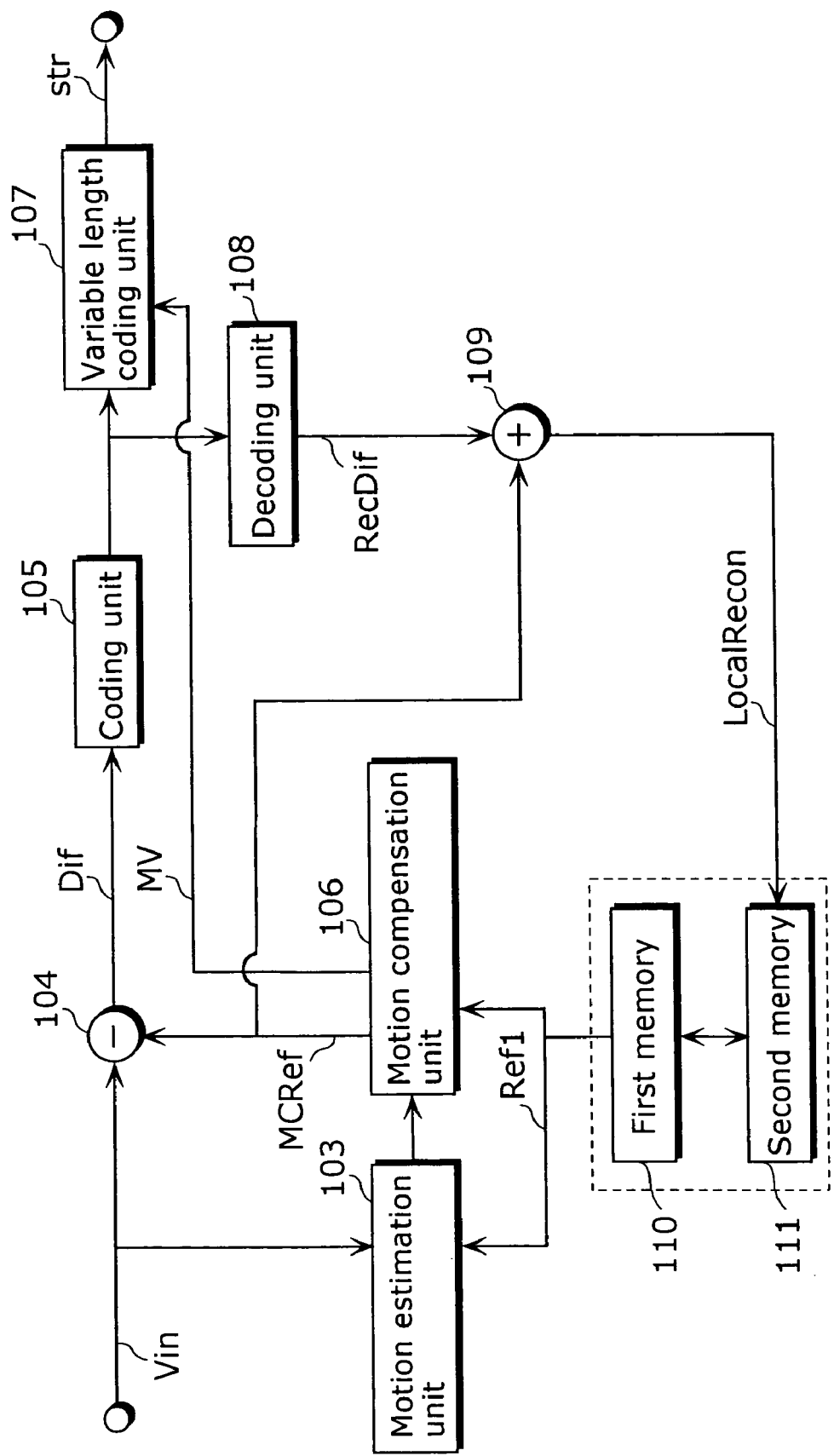
FIG. 1 is a block diagram showing the structure of the conventional moving picture coding apparatus.
Figure 2:
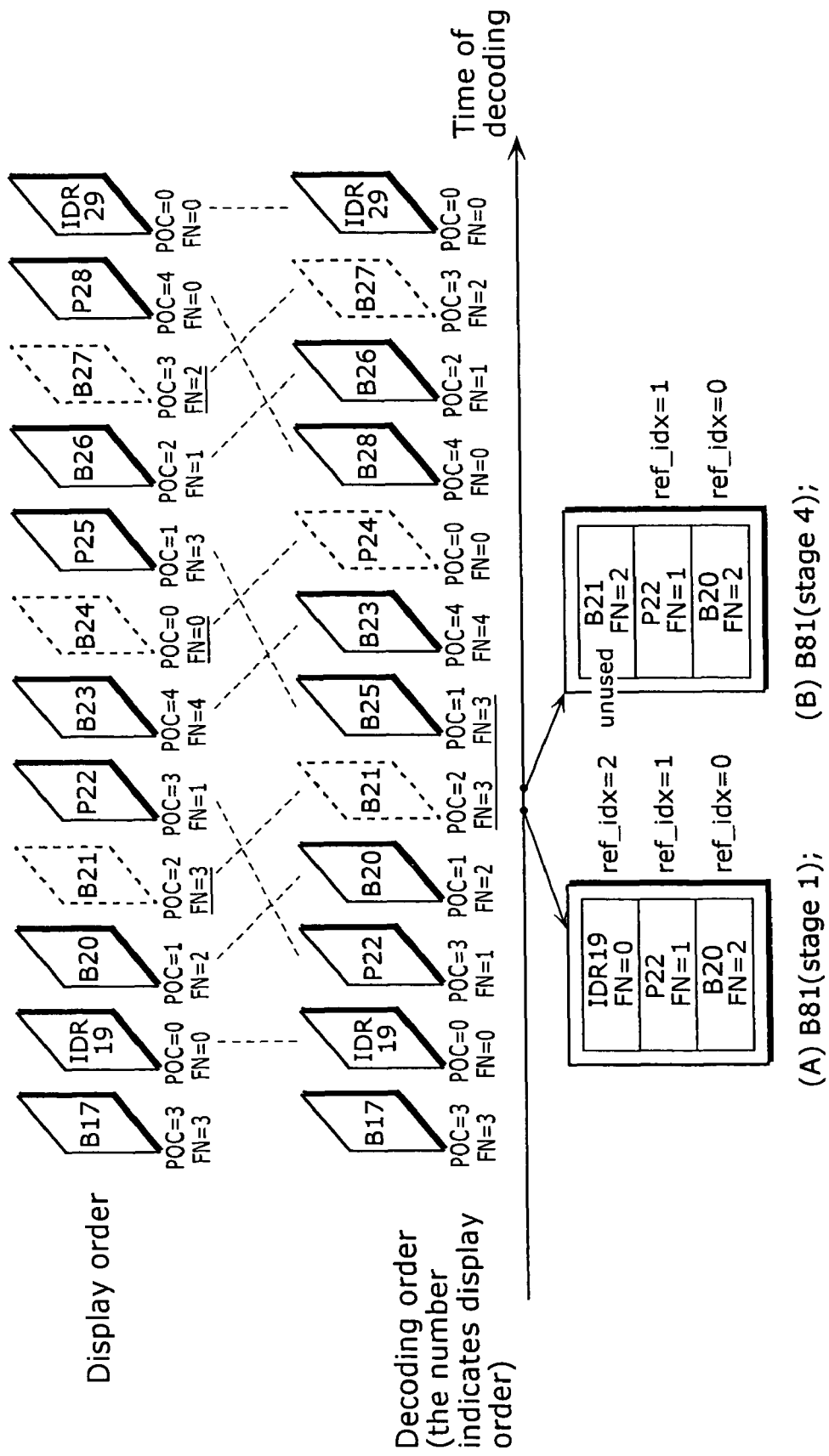
FIG. 2 is a diagram showing the concepts of a display order (POC) and a reference picture number (FN)
Figure 3:
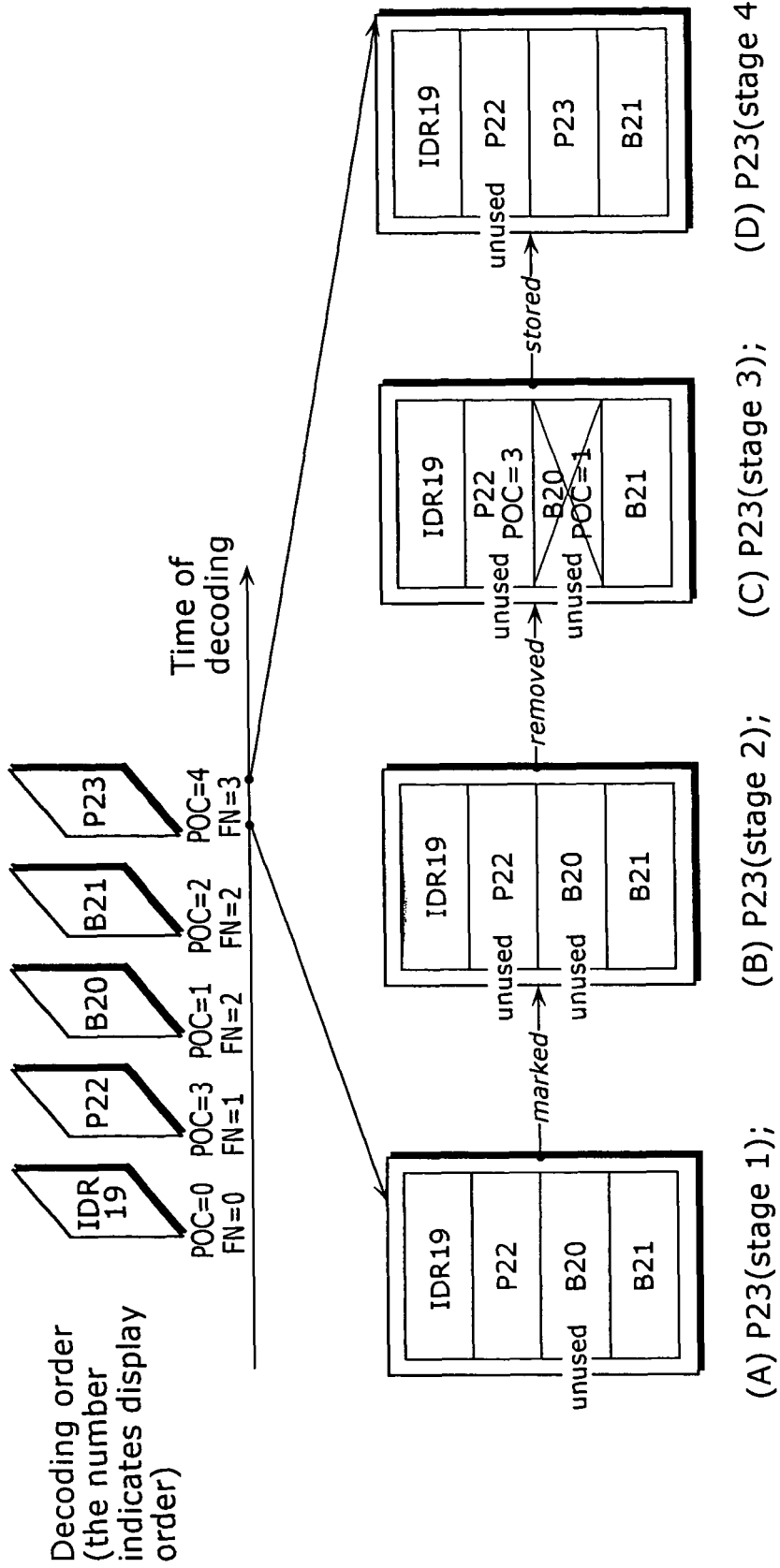
FIG. 3 is a diagram showing the operation of removing a picture in order to allocate a free space in a memory, when the memory has a picture marked as "unused"
Figure 4:
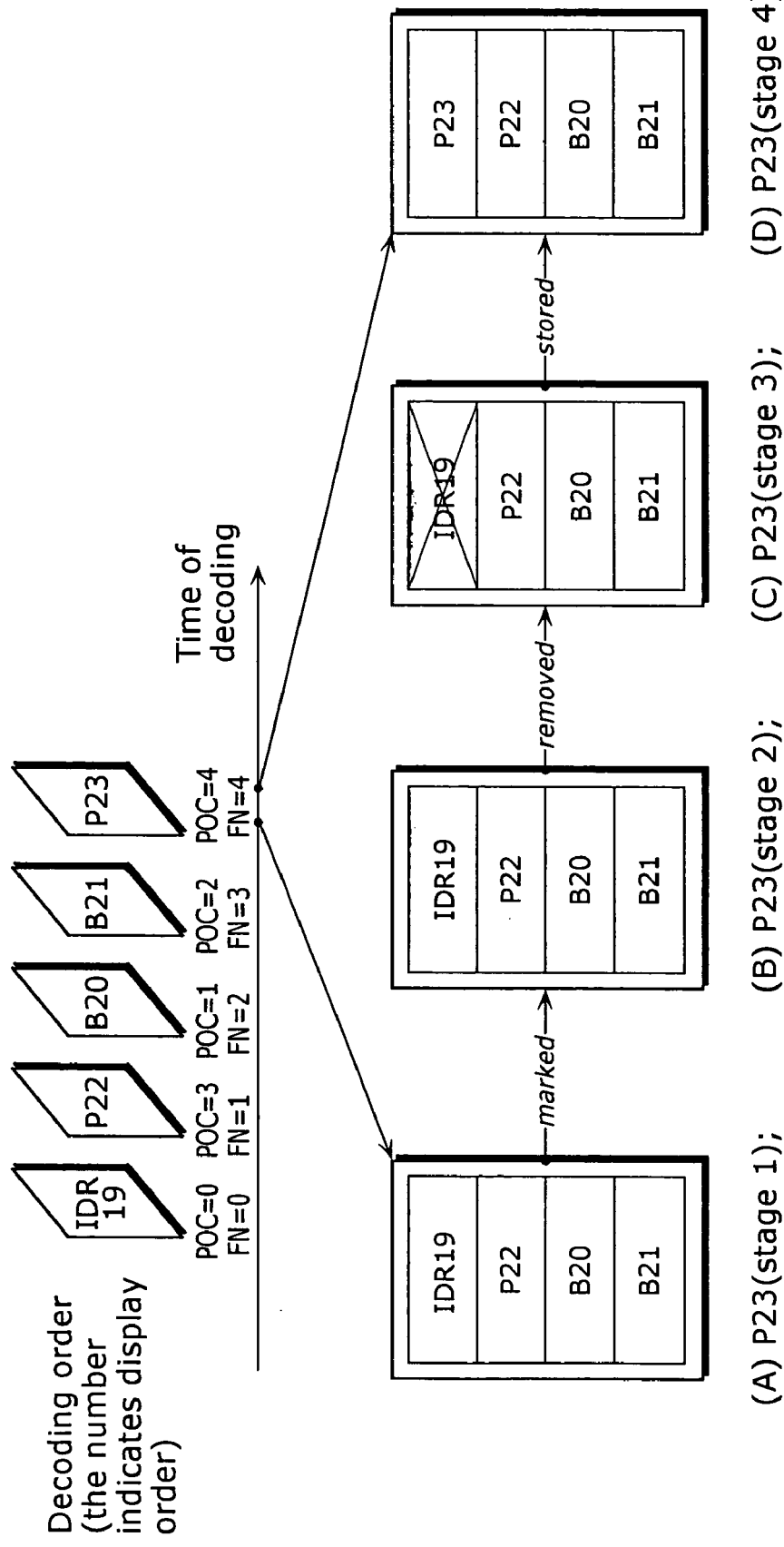
FIG. 4 is a diagram showing the operation of removing a picture in order to allocate a free space in a memory, when the memory does not have a picture marked as "unused"

The difference between the present moving picture coding apparatus and the conventional moving picture coding apparatus (FIG. 1) is that the former includes the flag information generation unit 112 and the variable length coding unit 113 which operates differently from the variable length coding unit 107.

The flag information generation unit 112 generates a flag indicating a non-sequentiality of the values presented as display order information POC, when the values indicated by the display order information POC are non-sequential because of editing or for other reasons.

The variable length coding unit 113 performs variable length coding and others on the inputted coded signal, further generates a coded stream Str by inserting information such as the flag generated by the flag information generation unit 112 and the motion vector MV inputted from the motion compensation unit 106, and outputs the generated coded stream Str outside the moving picture coding apparatus.

Figure 8:
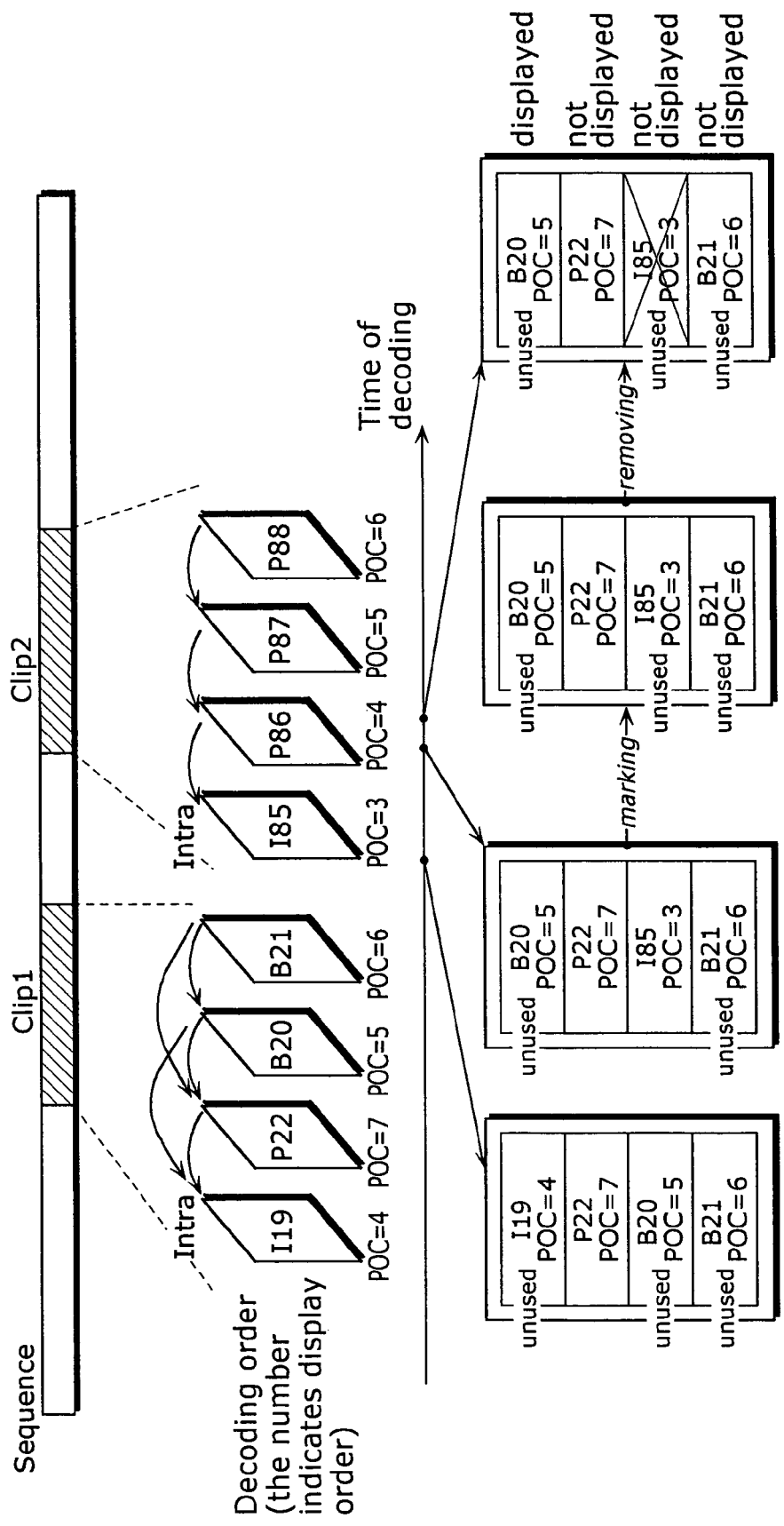
FIG. 8 is a conceptual diagram explaining the problem that a non-sequentiality in the sequence generates a non-seqentiality in the display order information POC and thereby removes a picture that is not yet displayed.
Figure 9:
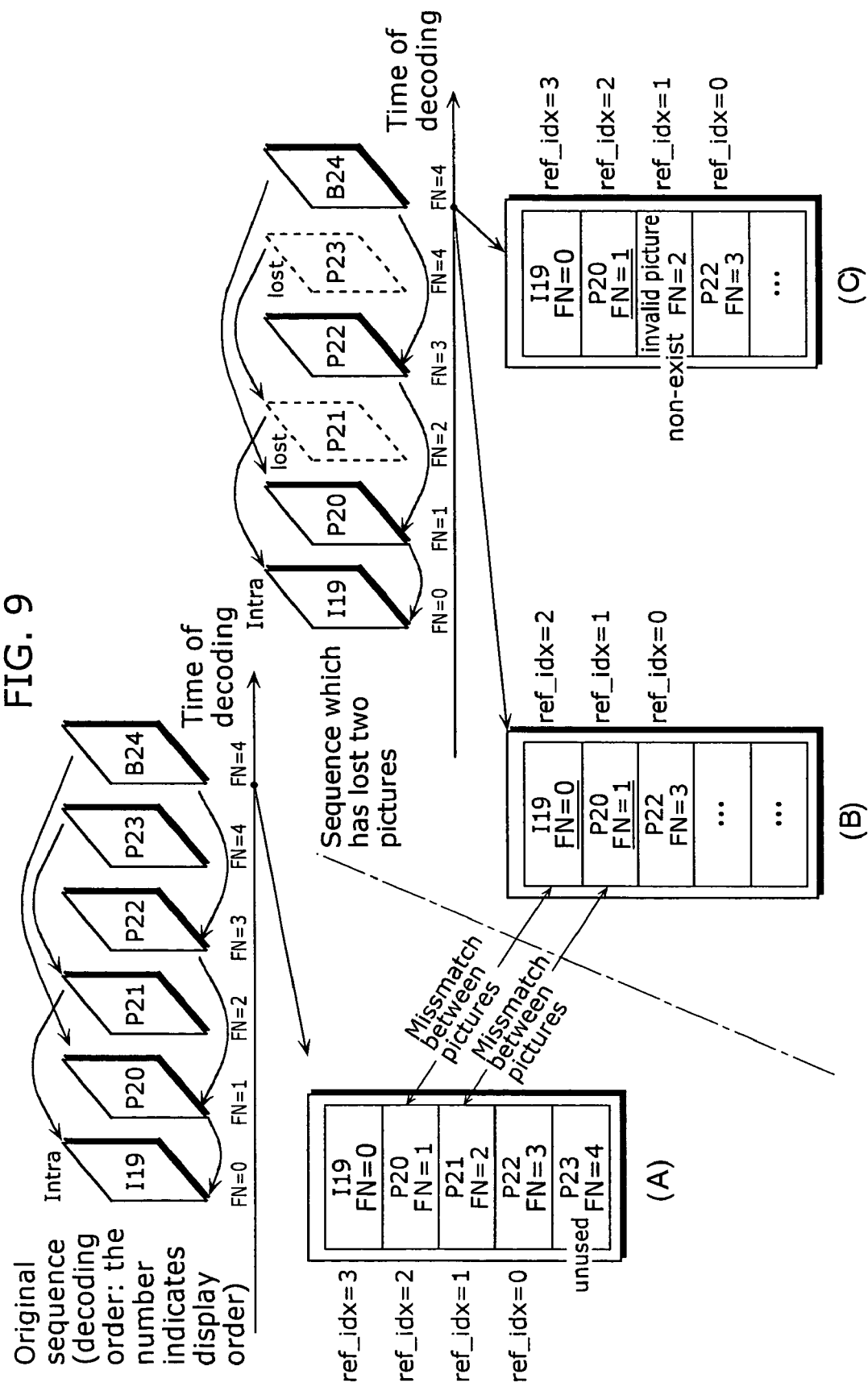
FIG. 9 is a conceptual diagram showing the operation for valid pictures.
Figure 18:
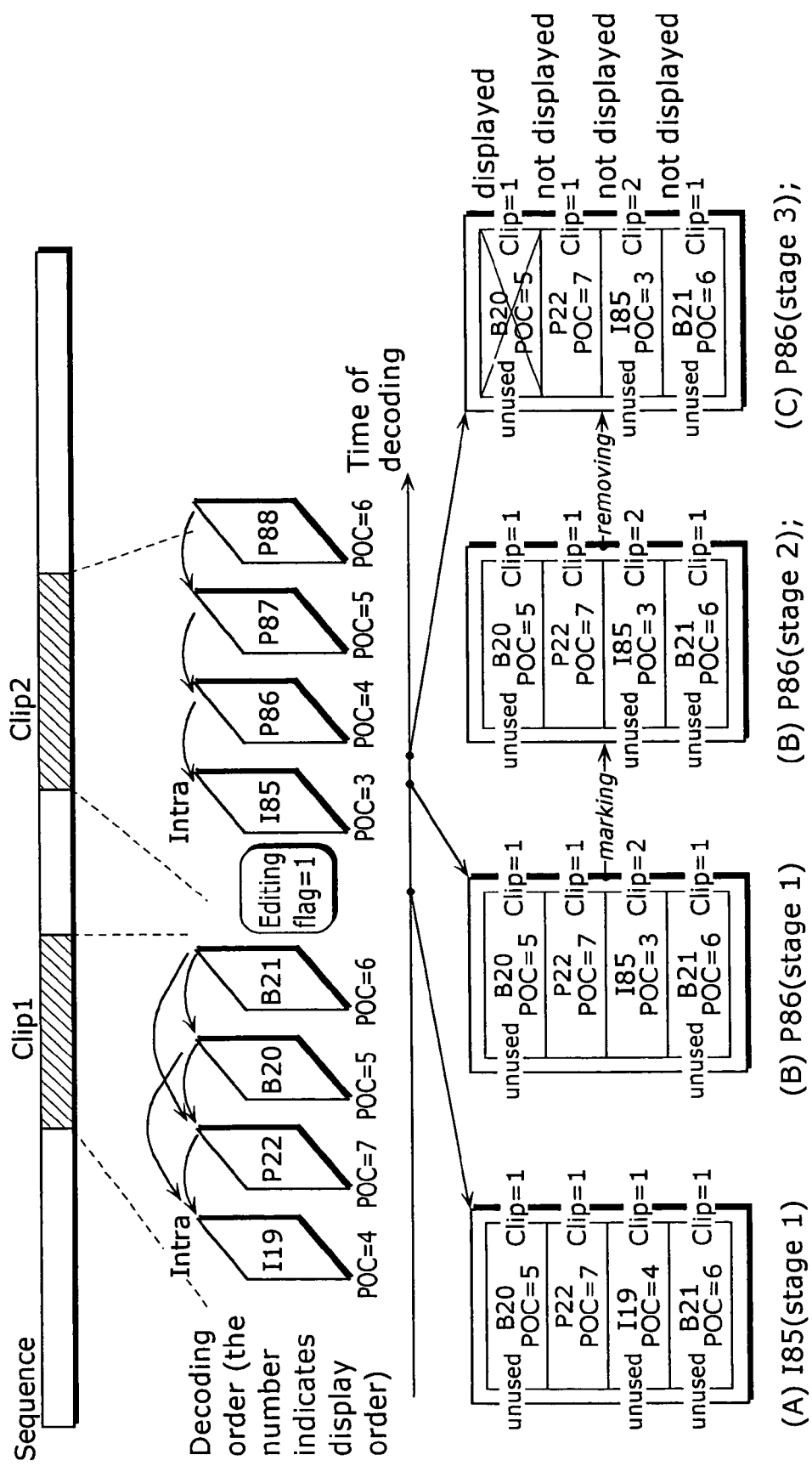
FIG. 18 is a diagram showing the concept of the moving picture decoding method according to the first embodiment of the present invention.

FIG. 18 is a diagram showing the concept used in the moving picture coding method and the moving picture decoding method according to the present invention. The diagram shows how to solve the existing problem shown in FIG. 8. Firstly, the non-sequentiality in the display order information POC caused by editing or for other reasons is detected by a flag inserted at the time of coding. This flag is called a flag A. The flag A is a flag indicating that the values indicated by the display order information POC are non-sequential because of editing or for other reasons.

As shown in the diagram, the flag A is special information to be placed immediately before Clip. Here, the flag A is assumed to be stored in a unit for storing additional information on video decoding called Supplemental Enhancement Information (to be referred to as "SEI" hereinafter) as defined by the JVT. The flag A, however, may be stored in a User Data Registered SEI which allows the user to define the unit on its own or in a Random Access Point SEI (to be referred to as RAP SEI hereinafter) for storing information on random access. The following information is stored in the RAP SEI: "broken_link_flag" indicating that the decoded moving picture may be different from the original moving picture due to editing, or other reasons; and "recovery_frame_cnt" indicating the "n" number, when the moving picture, in which the pictures following the "n" th picture in display order being based on the position of the RAP SEI are decoded, is same or almost same as the original moving picture. In the present invention, when "broken_link_flag" indicates "1", it shows that the editing is carried out and regards either of the following as an editing point: a position immediately before the first picture following the RAP SEI; a position immediately before the picture indicated in the "recovery_frame_cnt"; and the first picture that can be decoded independently (e.g., Intra Picture) following "RAP_SEI". It should be noted that the editing point indicates only the boundary between the pictures and not the boundary between the SEIs. A file format storing a sequence may store random access information for each of the pictures, and in some cases, such information may store the information indicating that the editing is carried out, and furthermore, the information on the editing point as well. In this case, a detection of the editing and an identification of the editing point are operated according to the information on the file format. Such storing format is called "flag A".

Figure 5:
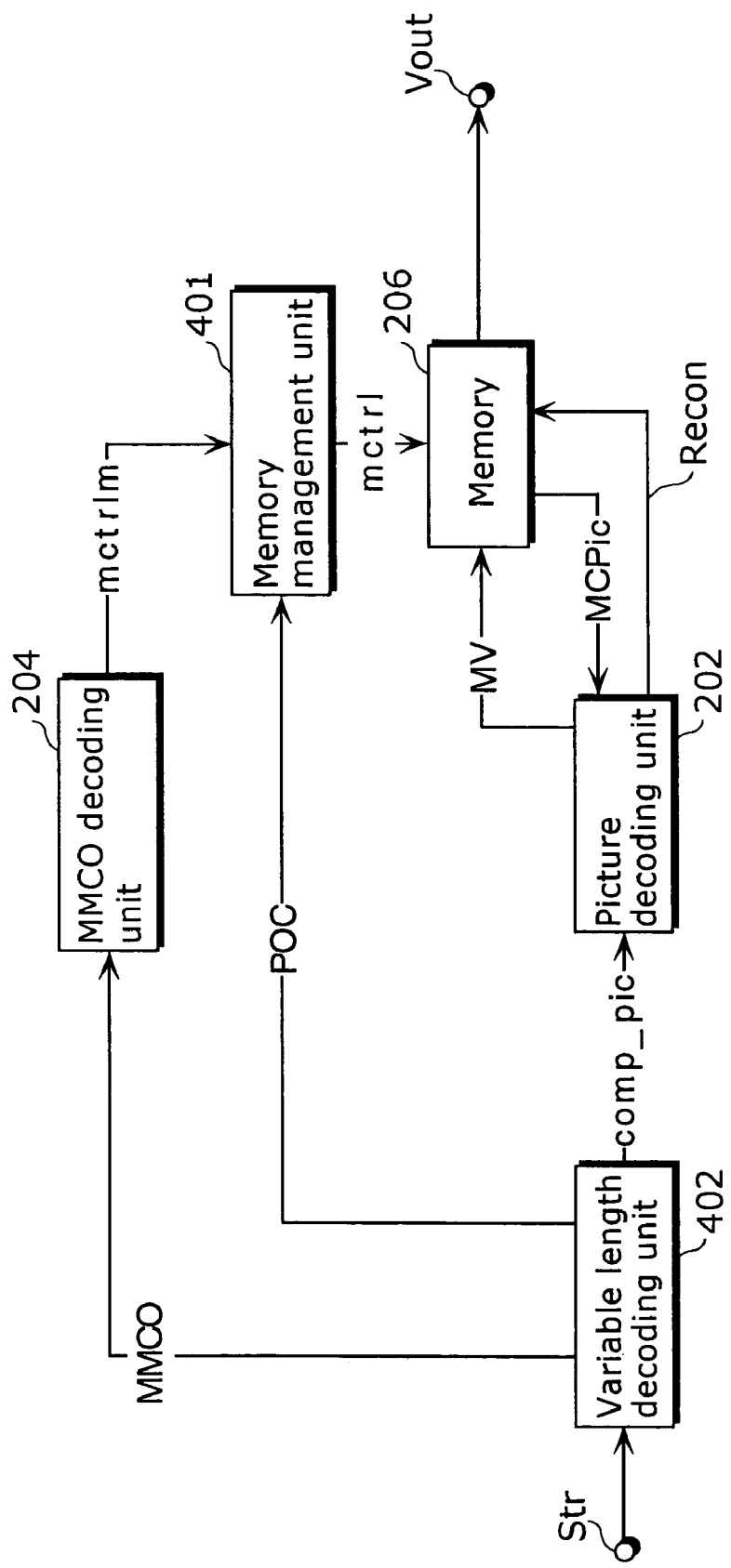
FIG. 5 is a block diagram showing the structure of the conventional moving picture decoding apparatus.
Figure 19:
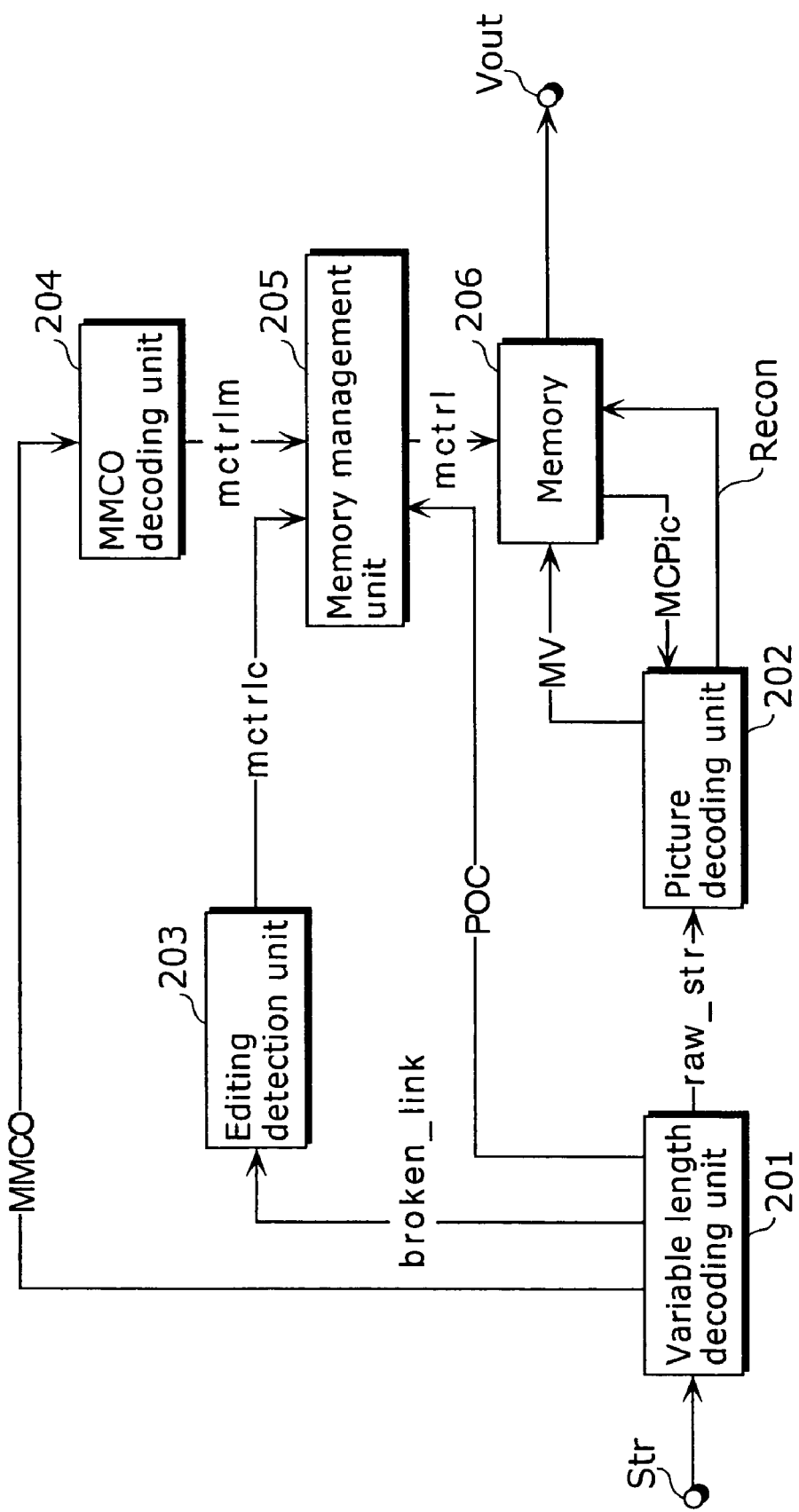
FIG. 19 is a block diagram showing the structure of the moving picture decoding apparatus according to the first embodiment of the present invention.

FIG. 19 is a block diagram showing the structure of the moving picture decoding apparatus according to the present embodiment. The difference between the present moving picture decoding apparatus and the conventional moving picture decoding apparatus (FIG. 5) is that the former includes an editing detection unit 203 and the memory management unit 205 which operates differently from the memory management unit 401.

The editing detection unit 203 obtains, from the variable length decoding unit 201, either a flag indicating that the values indicated by the display order information POC are non-sequential or the information storing the editing point information, analyzes the obtained information and outputs a control signal mctrlc to the memory management unit 205. When receiving the control signal mctrlc indicating that the editing has been carried out, the memory management unit 205 manages in such manner that the picture located before the editing point precedes the picture after the editing point in display order. That is to say, when selecting a picture to be removed from among the pictures marked as "unused", it is assumed that the display order of the picture located before the editing point precedes that of the picture located after the editing point.

With the view to manage the display order, the memory management unit 205 lets each of the pictures hold a Clip counter, which increases by 1 each time the processing shifts to the picture located after the editing point. As shown in (B) in the diagram, "Clip=1" is recorded for the pictures B20, P22, B21 while "Clip=2" is recorded for the picture I85 located after the editing point. In the unused marking processing at this state, the picture B20 having the earliest display time is removed out of the "unused" pictures with the Clip that is firstly decoded (the pictures B20, P22 and B21 marked as "Clip=1". In this way, the problem of removing the picture which is not displayed yet (the picture I85 in this case) can be solved.

Figure 6:
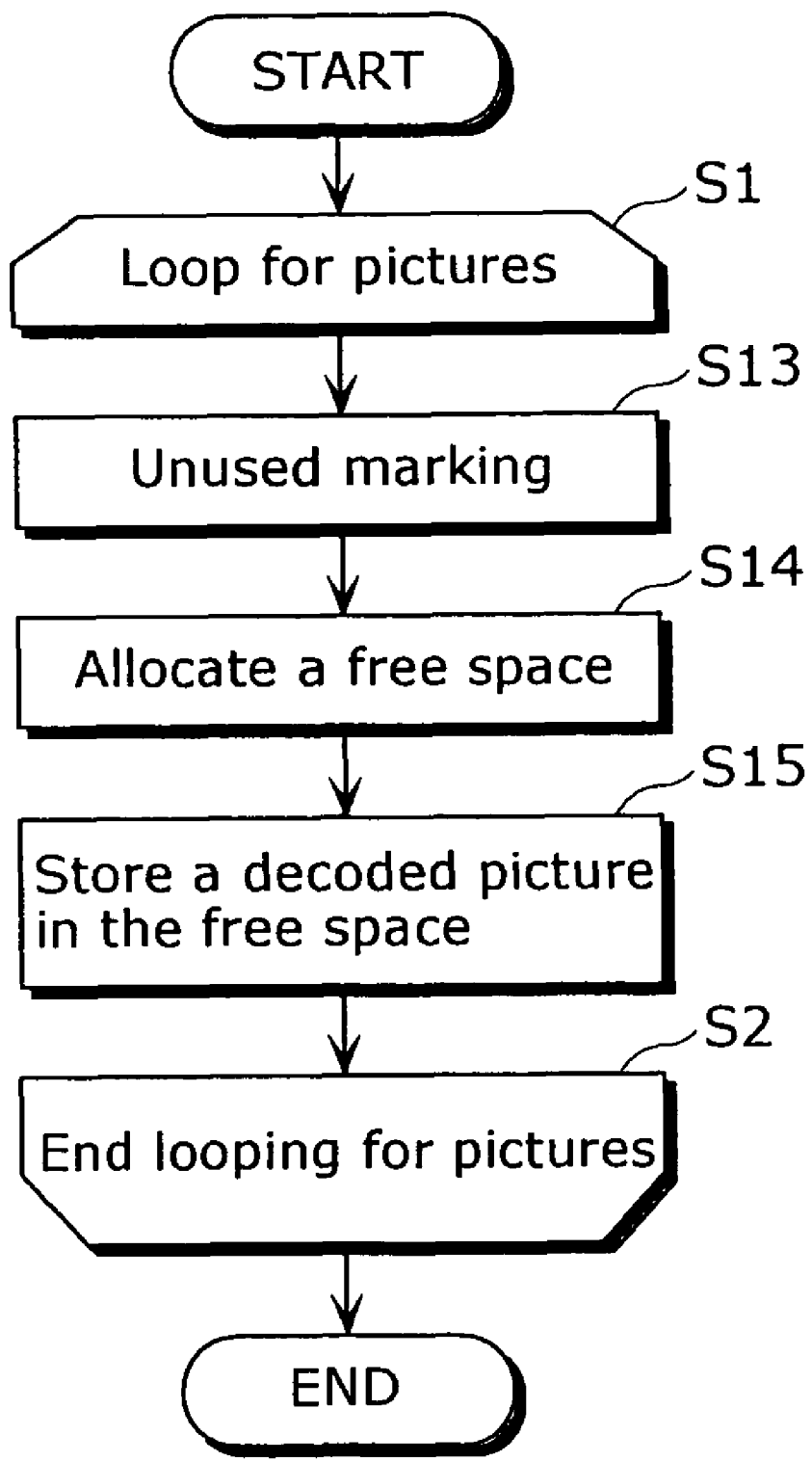
FIG. 6 is a flowchart showing the memory-related operation performed by the conventional moving picture decoding apparatus.
Figure 7:
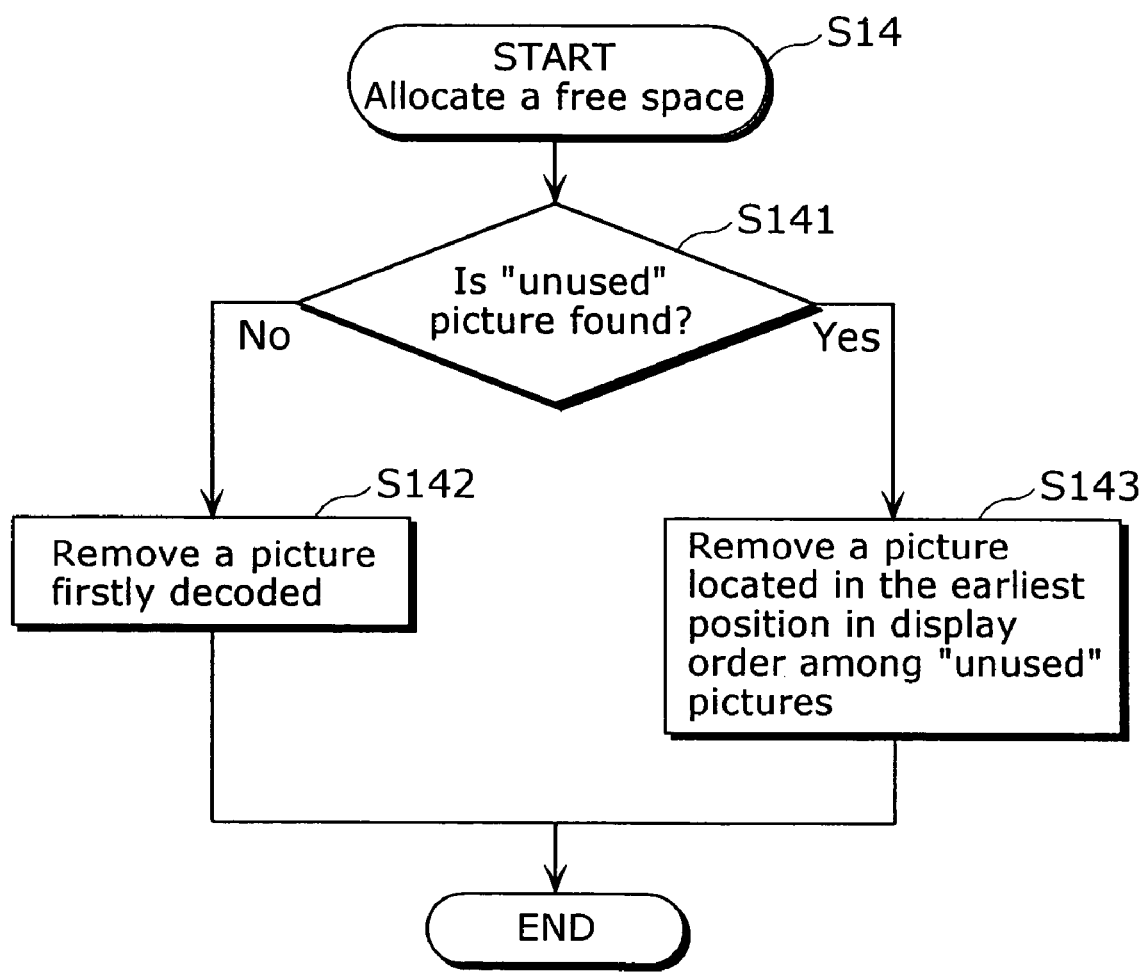
FIG. 7 is a flowchart showing the operation for allocating a free space performed by the conventional moving picture decoding apparatus.
Figure 20:
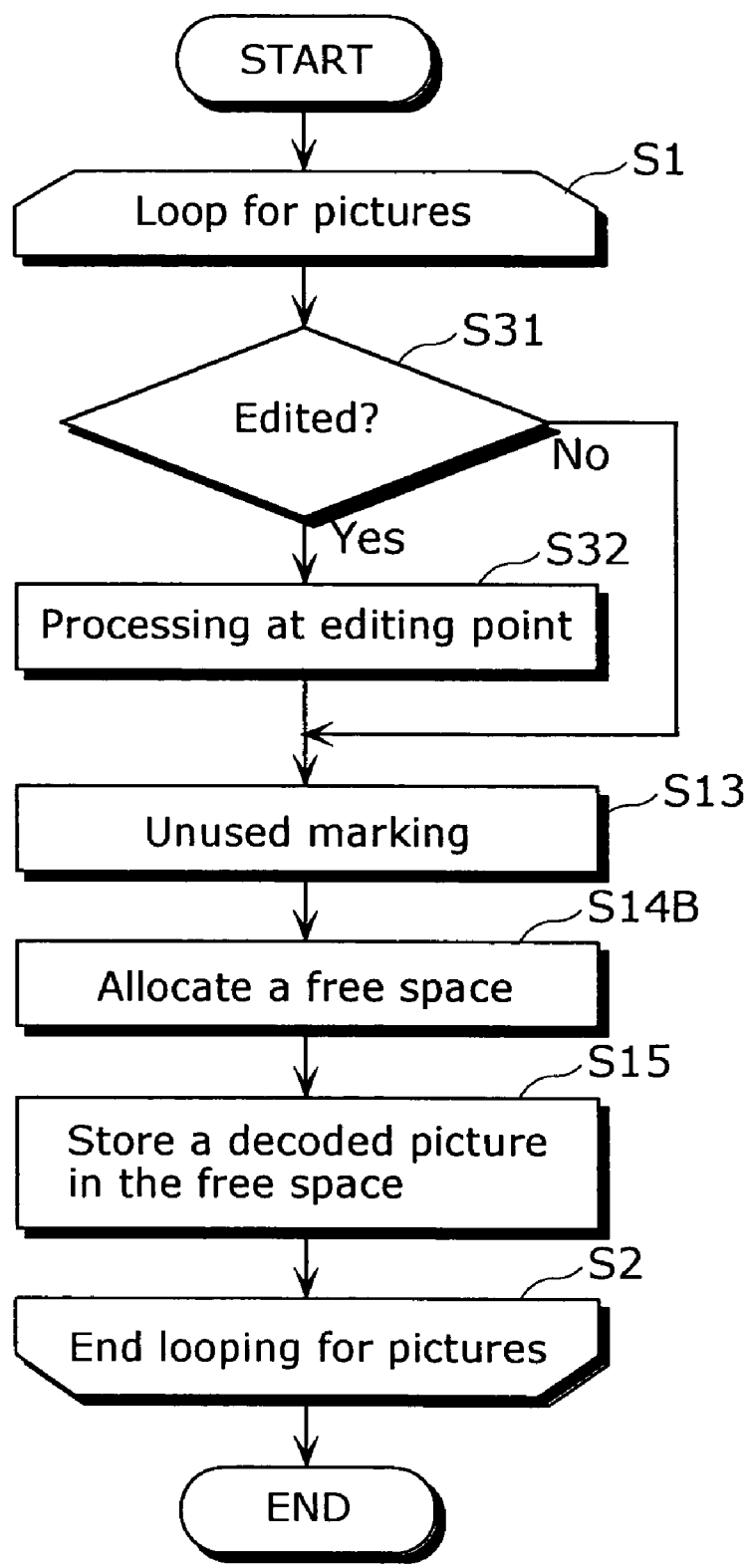
FIG. 20 is a flowchart showing the operation performed in the moving picture decoding method according to the first embodiment of the present invention.

FIG. 20 is a flowchart showing the operation performed in the moving picture decoding method according to the present embodiment. In the present moving picture decoding method, Steps S31 and S32 are added and Step S14 is modified to Step S14B, which is different from the conventional method (FIG. 6). After starting the processing on a picture-by-picture basis (Step S1), whether or not the moving picture is edited is examined (Step S31). When the editing is detected, processing at the editing point is operated (Step S32). When the editing is not detected, the unused marking processing is performed as in the conventional case (Step S13) and the processing of allocating a free space in consideration of the decoding order in the vicinity of the editing point is operated (Step S14B). The "processing at the editing point" is operated in order to identify the editing point. The memory management unit 205 increases the Clip counter by 1 each time the processing is shifted to the picture which is located after the editing point.

Figure 21:
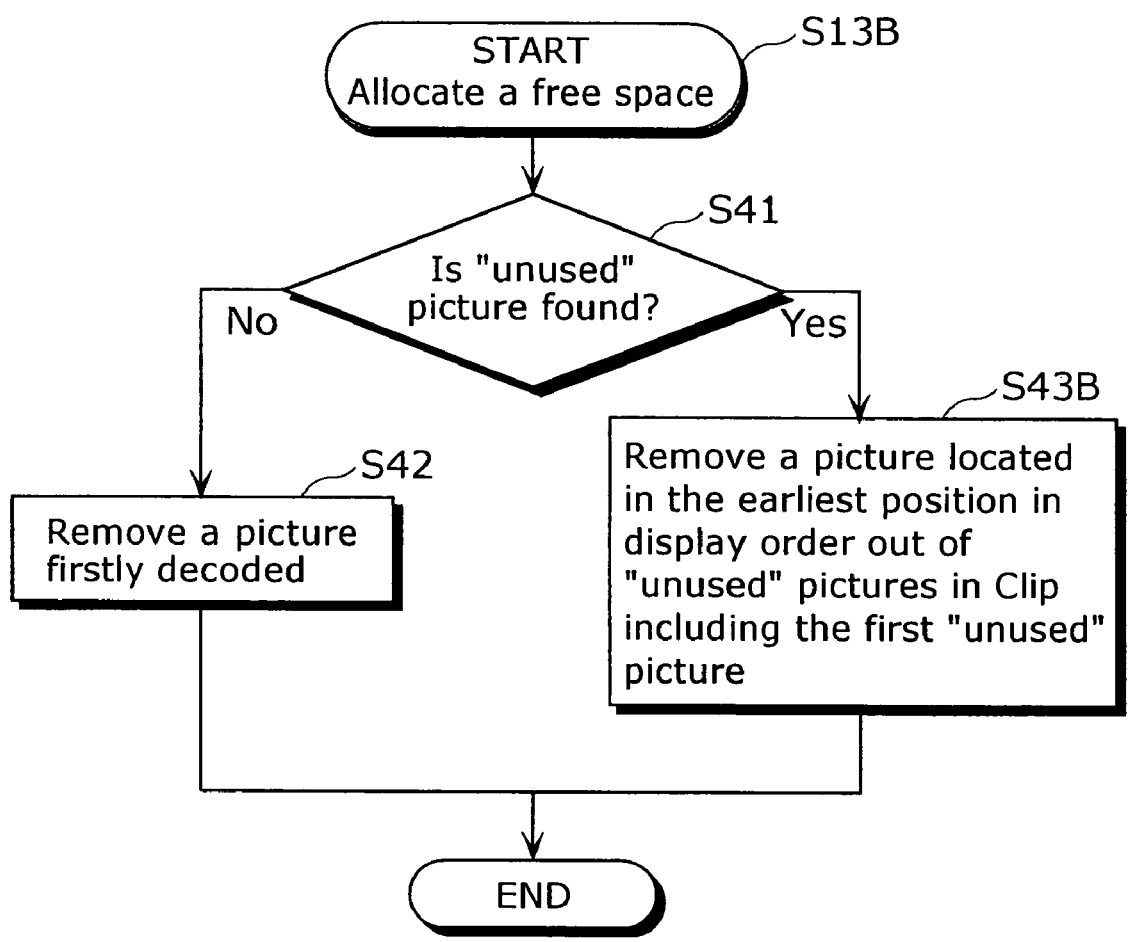
FIG. 21 is a flowchart showing the operation of allocating a free space in the memory performed by the moving picture decoding apparatus according to the first embodiment of the present invention.

FIG. 21 is a flowchart showing the operation of allocating a free space performed in the moving picture decoding method according to the present embodiment. In the present decoding method, Step S43 is modified to S43B, which is different from the conventional method (FIG. 6). When "unused" pictures are stored in the memory (Step S41), the Clip including the "unused" pictures is searched in prioritizing the Clip which is located earlier in decoding order, and the picture located in the earliest position in display order among the "unused" pictures in the Clip is removed. In other words, the picture located in the earliest position in display order among the "unused" pictures in the Clip including the first "unused" picture in decoding order, is removed. That is to say, the picture located in the earliest position in display order among the "unused" pictures located between the editing points immediately before and after the "unused" picture in the earliest position in decoding order, is removed.

As described above, it is detected that the values indicated by the display order information POC are non-sequential because of editing or for other reasons by using the flag which is inserted into the stream at the time of coding. Based on this, the picture to be removed is determined so that the problem of removing the picture which is not displayed yet (the picture I85 in the example shown in FIG. 8) can be solved.

The information indicating the editing point is necessary for solving the non-sequentiality caused by editing with the use of such moving picture decoding method according to the present invention (FIGS. 18, 19, 20 and 21). Therefore, it is desirable that the information indicating the inclusion of the editing point information is located in the place to which the decoding apparatus can easily access.

In the present embodiment, the flag indicating the non-sequentiality in the display order information POC is inserted between the pictures whose values indicated by the display order information POC are non-sequential, but the present invention is not limited to this. For example, the flag information generation unit 112 may generate the flag indicating the non-sequentiality in the display order information POC as well as the information for identifying the position where the values indicated by the display order information POC are non-sequential (i.e., editing point). Such information may be stored in a sequence parameter set or in the User Data Registered SEI which allows the user to define a unit on its own so that the information is arranged in a place in the sequence to which the user can access easily, for instance, at the head of the sequence. The information may be stored in a medium which records the sequence or in a file format which manages the sequence. Such storing format is called "flag A2".

In this case, when obtaining a flag A2 from such place and thereby the editing point information, the editing detection unit 203 performs the moving picture decoding method according to the present invention (FIGS. 18, 19, 20 and 21) at the time of decoding.

Second Embodiment

The structure of the moving picture coding apparatus according to the present embodiment is as same as the one shown in the block diagram in FIG. 17 in the first embodiment.

In the present embodiment, when the frame numbers FN are non-sequential as a result of editing or for other reasons, the flag information generation unit 112 generates a flag B indicating the non-sequentiality.

It should be noted that the flag B generated by the flag information generation unit 112 may be a flag instructing not to insert invalid pictures. The method of inserting the flag B is as same as the one used for inserting the flag A shown in the first embodiment.

Figure 10:
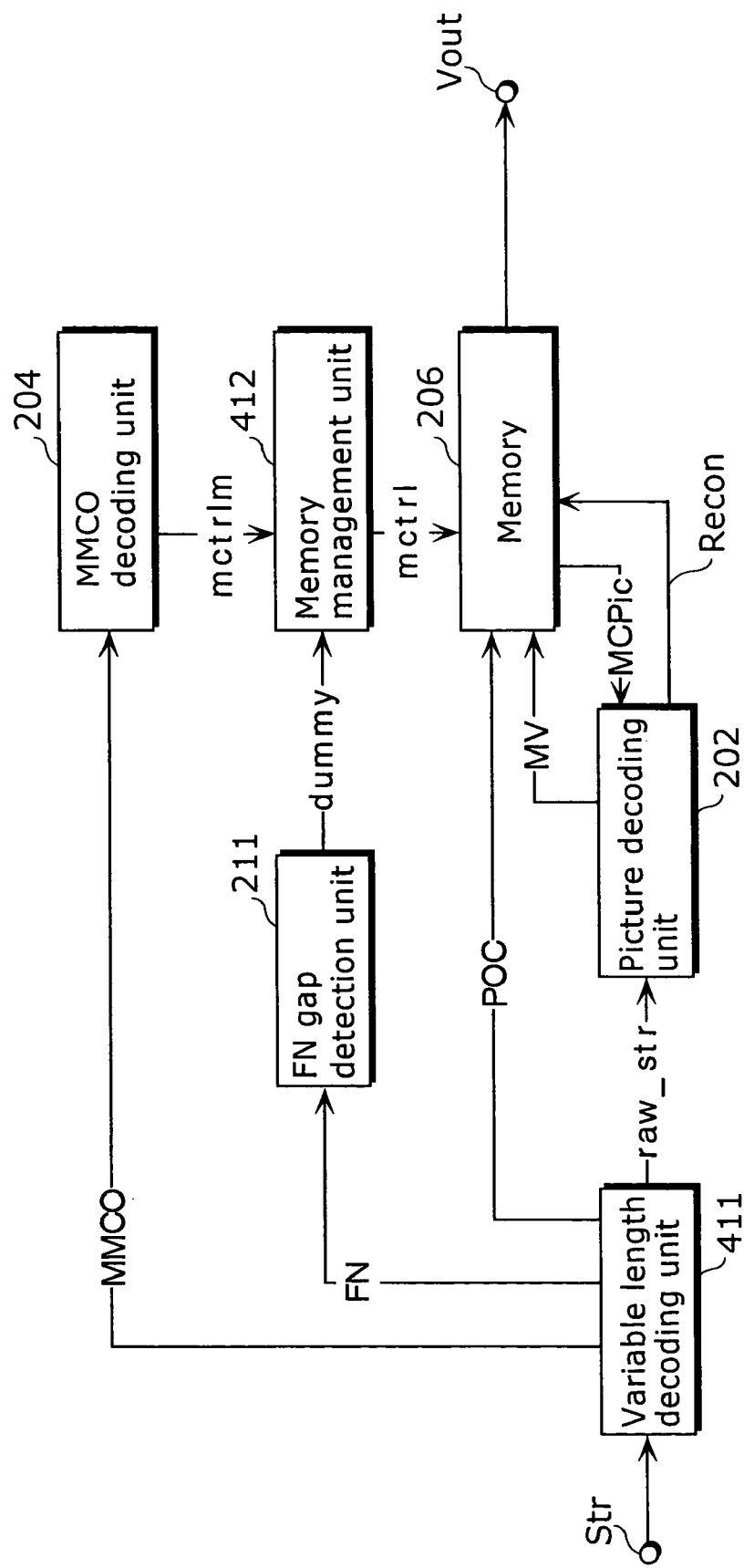
FIG. 10 is a block diagram showing the structure of the conventional moving picture decoding apparatus.
Figure 22:
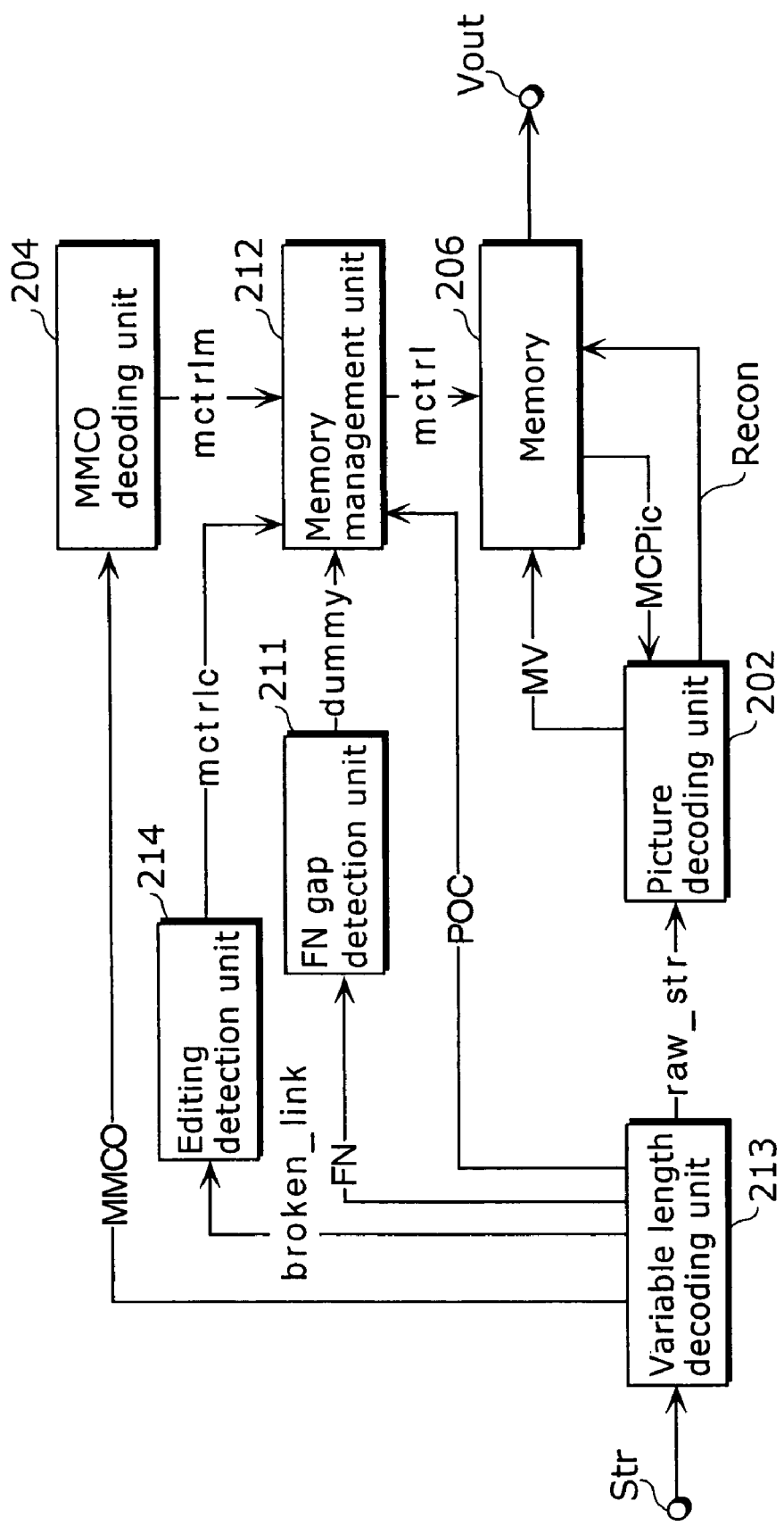
FIG. 22 is a block diagram showing the operation performed in the moving picture decoding method according to a second embodiment of the present invention.

FIG. 22 is a block diagram showing the structure of the moving picture decoding apparatus according to the present embodiment. The diagram shows that an editing detection unit 214 is added and a modification is made for the memory management unit 212, respectively to the conventional moving picture decoding apparatus described in FIG. 10.

The edition detection unit 214 obtains, from the variable length decoding unit 201, the flag indicating that the frame numbers FN are non-sequential, and outputs a control signal ctrl_c to the memory management unit 212. Even when the FN gap detection unit 211 inputs a request for inserting valid pictures by means of the control signal ctrl_c, the memory management unit 212 does not insert the invalid pictures when the editing detection unit 214 informs that the editing is detected.

Figure 11:
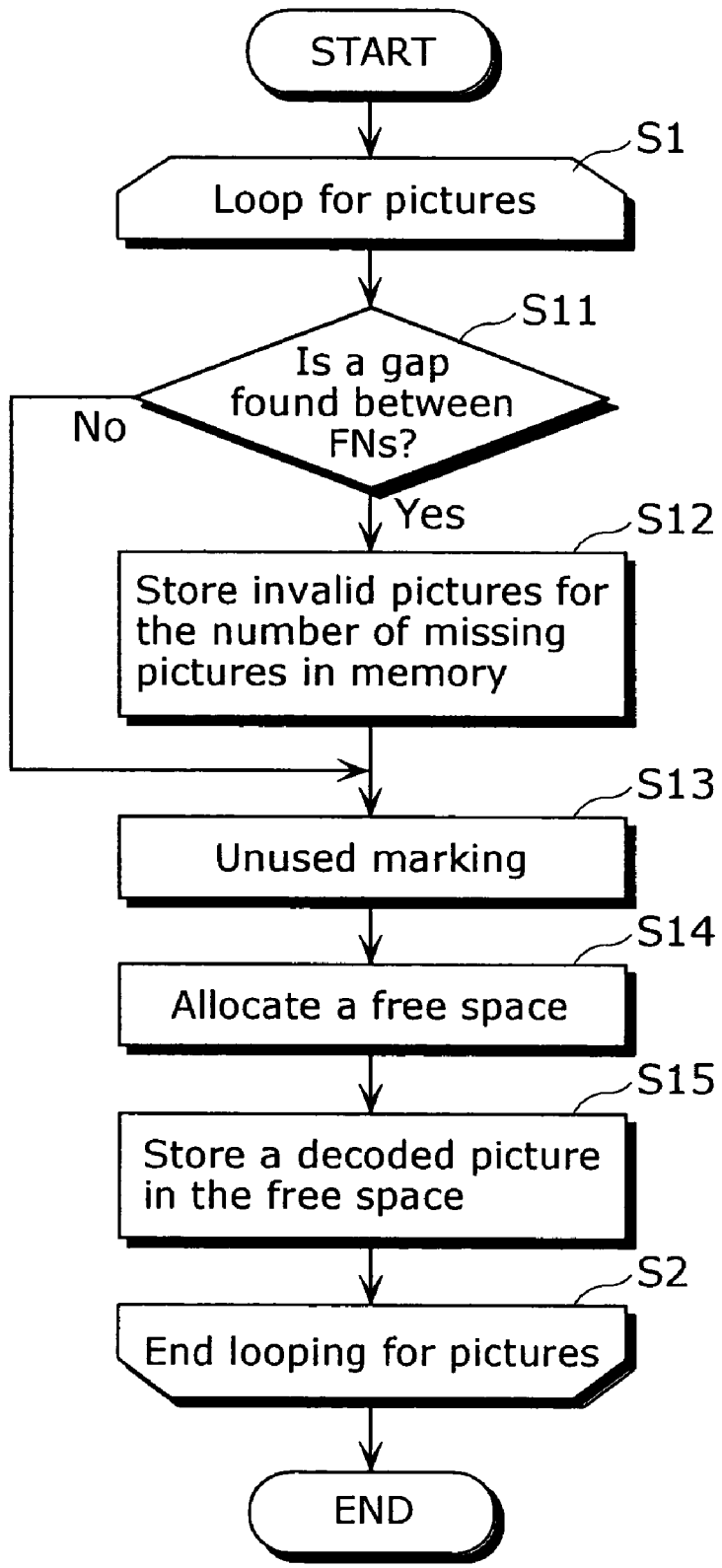
FIG. 11 is a flowchart showing the operation for valid pictures performed by the conventional moving picture decoding apparatus.
Figure 23:
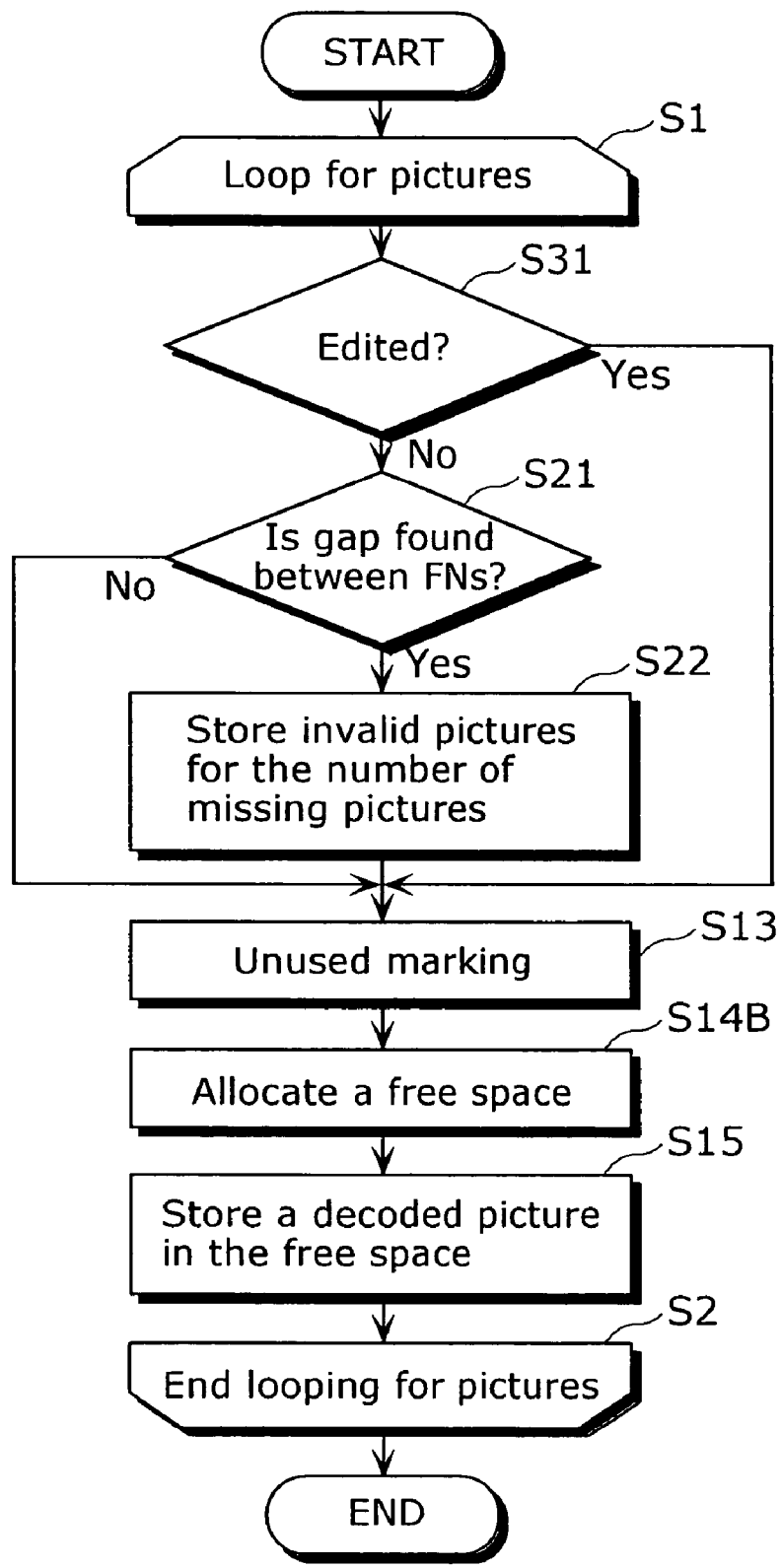
FIG. 23 is a flowchart showing the operation performed in the moving picture decoding method according to the second embodiment of the present invention.

FIG. 23 is a flowchart showing the operation performed in the moving picture decoding method according to the present invention. The diagram shows that Step 31 is added and a modification is made concerning Step S14 in the flowchart shown in FIG. 11 in the case of employing the conventional moving picture decoding apparatus. Other steps are carried out in the same manner as the steps having the same referential marks shown in FIG. 11, and the description is abbreviated here. The Steps S31 and S14B are the same as the Steps S31 and S14B executed by the decoding apparatus according to the first embodiment of the present invention so that the description is abbreviated here.

Figure 12:
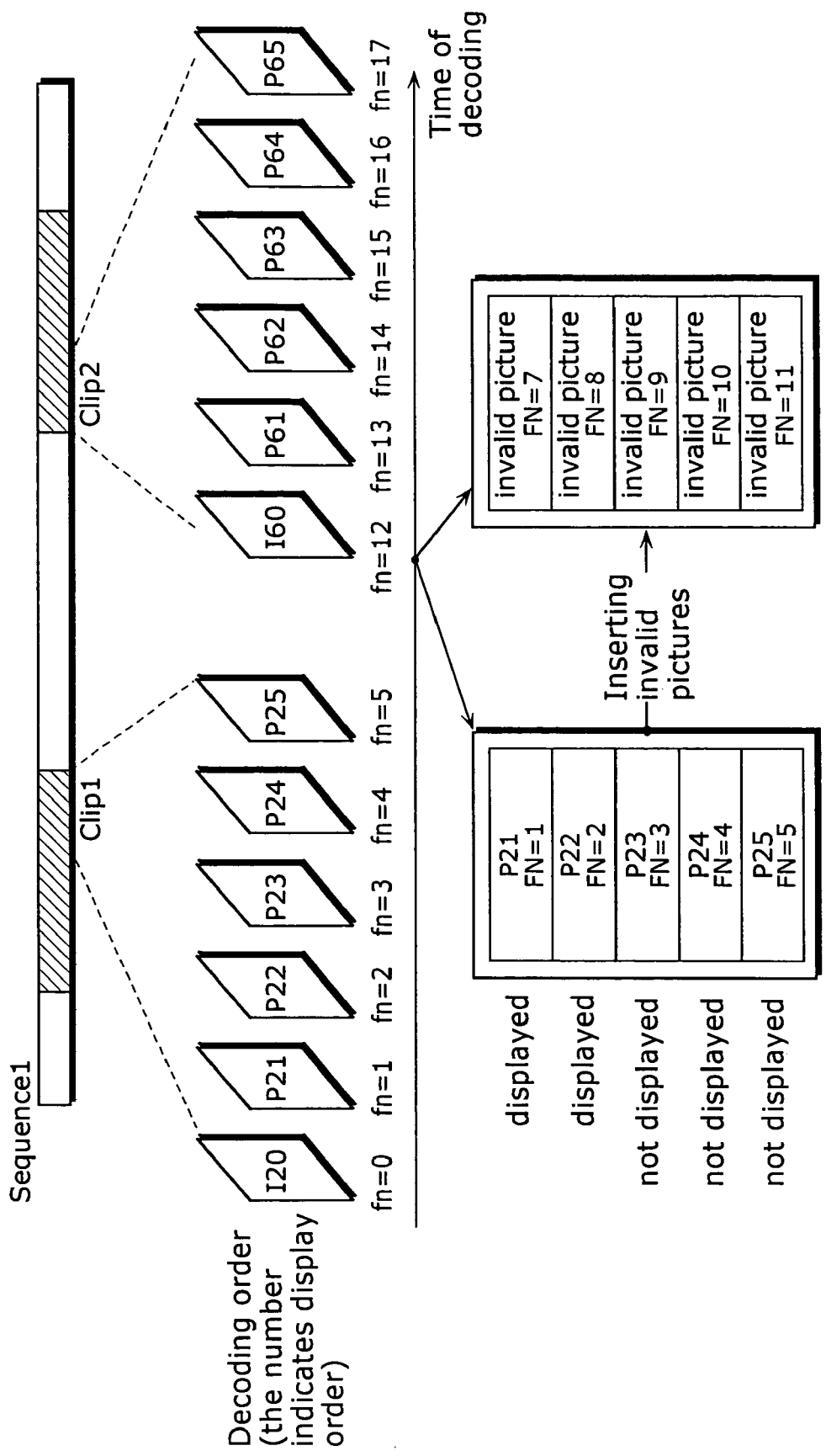
FIG. 12 is a conceptual diagram showing the problem that the non-sequentiality in the sequence generates a non-sequentiality in the frame number FN and that the invalid picture removes the picture which is not displayed yet.
Figure 14:
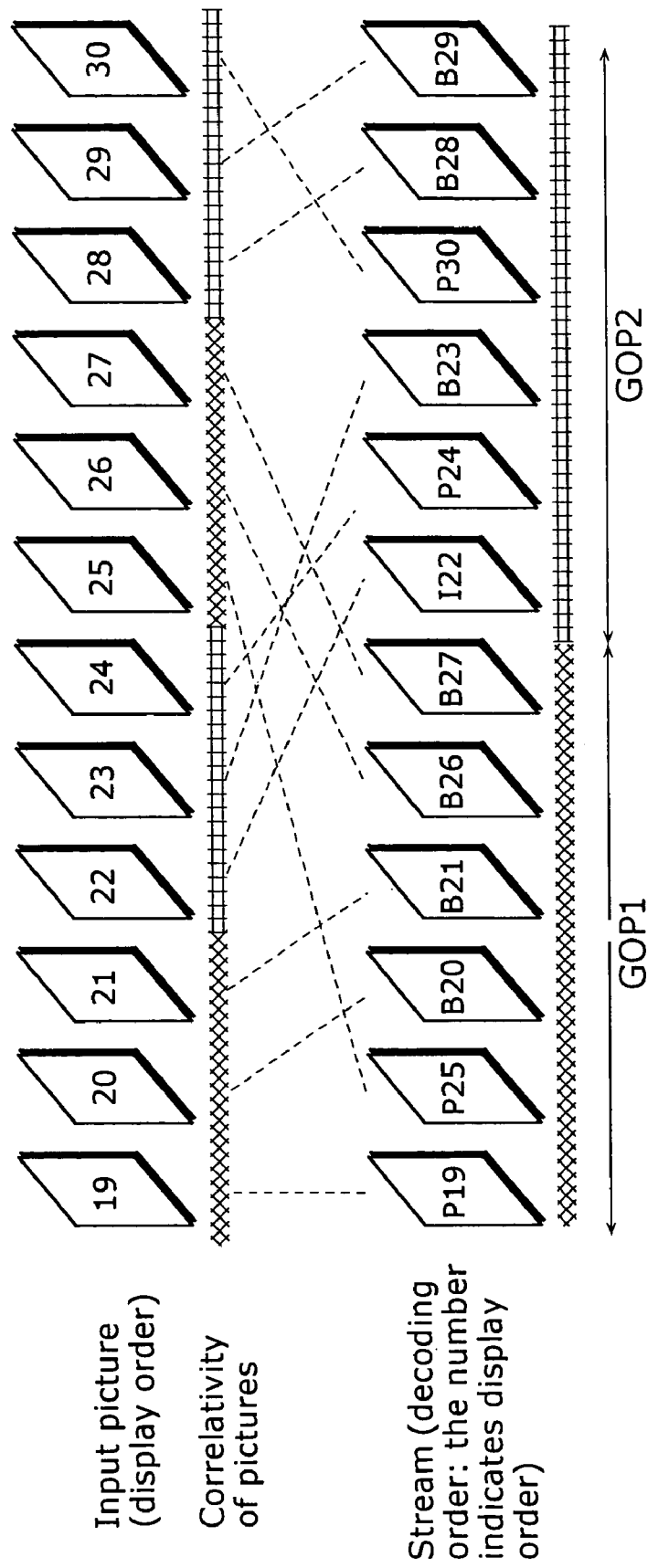
FIG. 14 is a conceptual diagram showing the conventional moving picture coding method according to the JVT.
Figure 15:
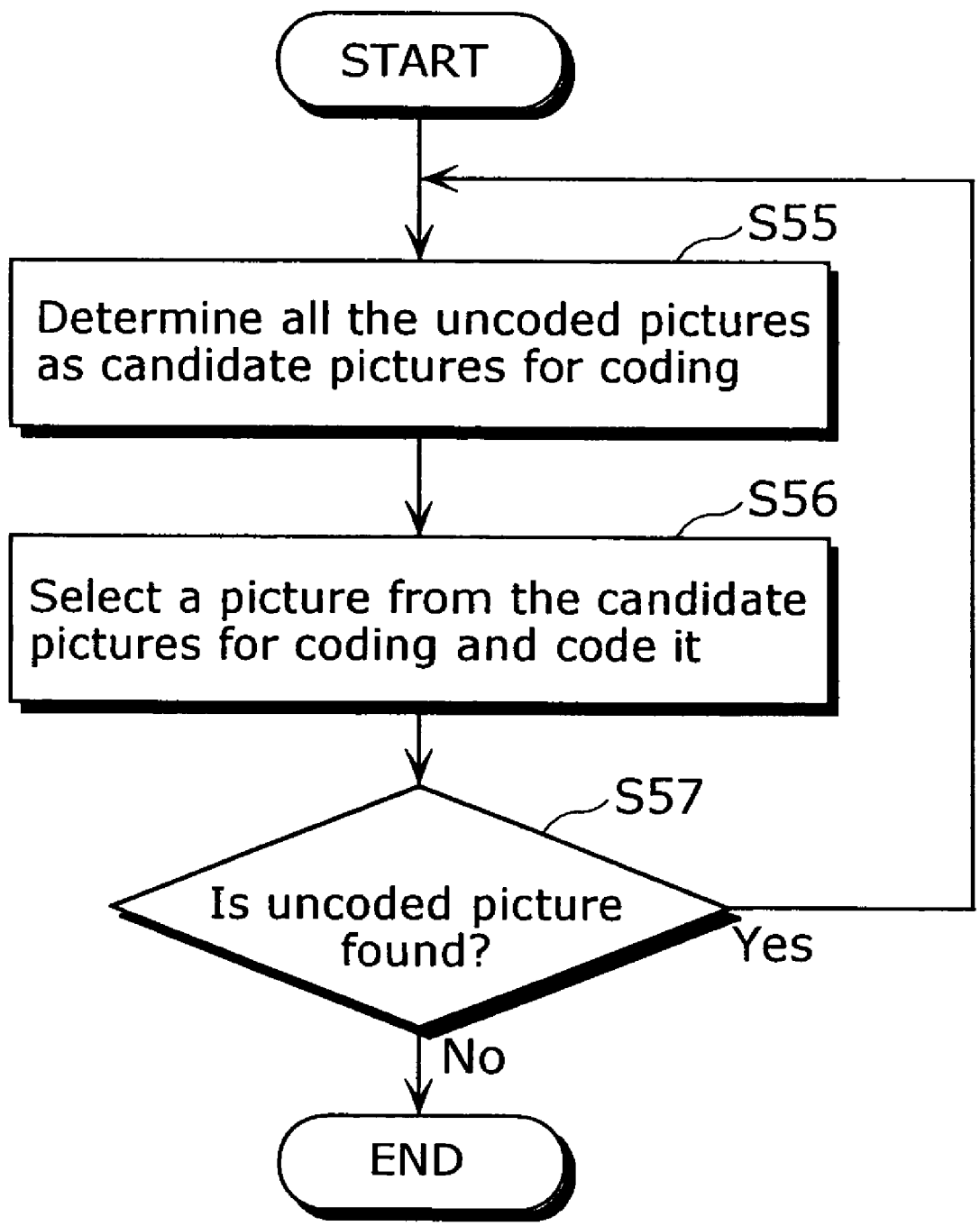
FIG. 15 is a flowchart showing the conventional moving picture coding method according to the JVT.

As is described above, an invalid picture is inserted after the detection that the frame numbers FN are non-sequential as a result of editing or for other reasons, according to the flag inserted at the time of coding. It is therefore possible to solve the problem of removing the pictures which are not displayed yet (the pictures P23, P24 and P25 in the example shown in FIG. 12).

It should be noted that, in the present embodiment, the flag indicating that the frame numbers FN are non-sequential is inserted between the pictures where the non-sequentiality in the frame number FN occurs, as shown in the first embodiment. The present invention, however, is not limited to this. For example, the flag information generation unit 112 may generate the flag indicating the non-sequentiality in the frame number FN and the information for identifying the position where the frame numbers FN are non-sequential (i.e., editing point). Such information then is stored in the same manner as described in the first embodiment.

In this case, when obtaining a flag B2 from the same place as mentioned in the first embodiment and the editing point information, the editing detection unit 203 performs the processing performed in the moving picture decoding method according to the present invention (FIGS. 22 and 23).

Figure 24:
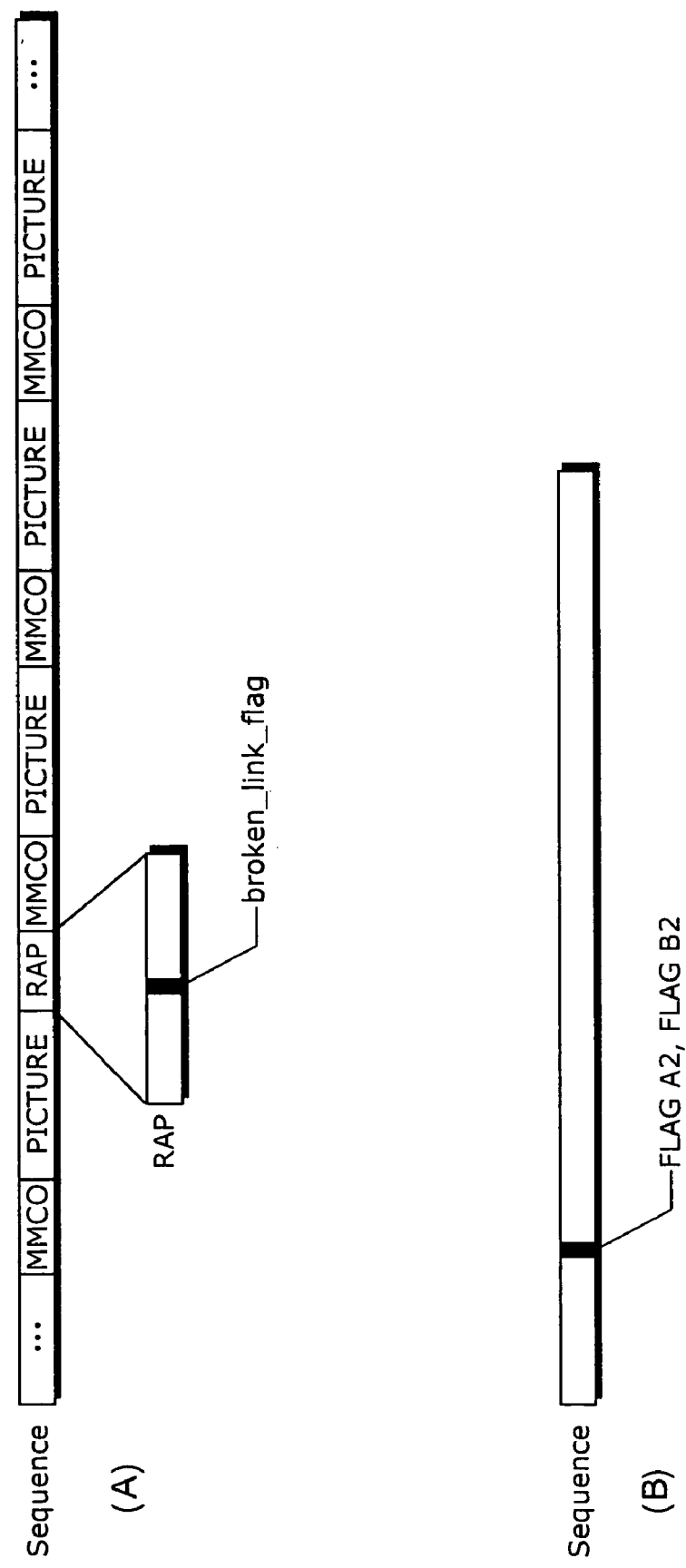
FIG. 24 is a diagram showing the structure of the data outputted by the moving picture coding method according to the present invention and the structure of the data inputted by the picture decoding method according to the present invention.

FIG. 24 is a diagram showing the structure of the data outputted based on the moving picture coding method according to the present invention and that of the data inputted based on the moving picture decoding method according to the present invention, described in the first and second embodiments. A sequence, which is a coded moving picture signal, includes data such as "RAP", "MMCO" and "PICTURE" as shown in (A) in the diagram. The "RAP" presents Random Access Point SEI including "broken_link_field", the flag A mentioned in the first embodiment, which is also the flag B mentioned in the second embodiment. The "PICTURE" is a moving picture signal which is coded on a picture basis and, in some cases, the "MMCO" is located before the "PICTURE" (not so in other cases). The "MMCO" is instruction information used in a memory management control operation. As shown in (B) in the diagram, the flag A2 mentioned in the first embodiment, which is also the flag B2 mentioned in the second embodiment, is stored in either of the following places: in the sequence, in a predetermined position of the file format associated with the sequence, and in a recording medium for recording the sequence, or in other places.

Third Embodiment

Figure 25:
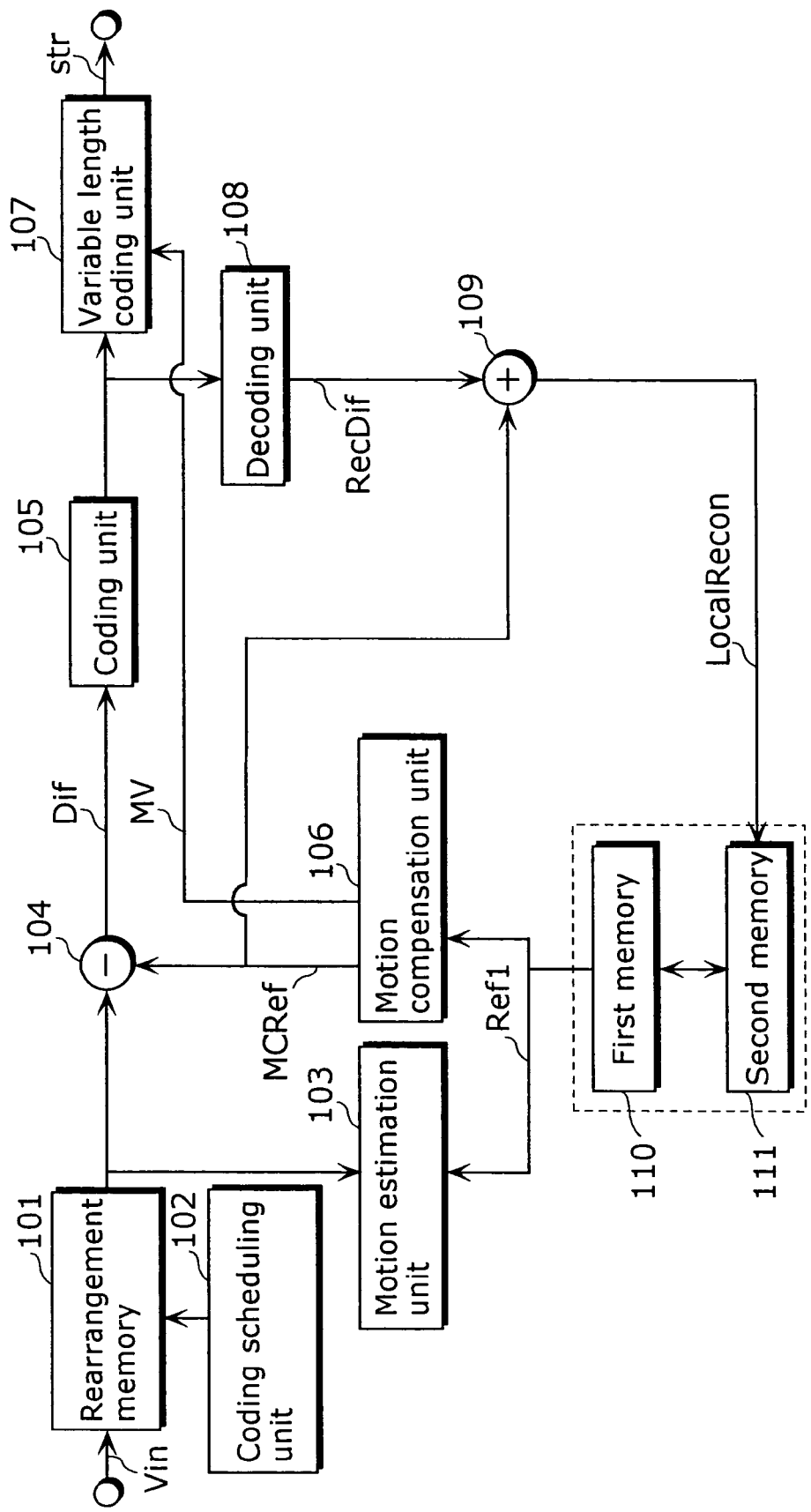
FIG. 25 is a block diagram showing the structure of the moving picture coding apparatus according to a third embodiment of the present invention.

FIG. 25 is a block diagram showing the structure of the moving picture coding apparatus according to the present embodiment.

The moving picture coding apparatus is composed of a rearrangement memory 101, a coding scheduling unit 102, a motion estimation unit 103, a subtracter 104, a coding unit 105, a motion compensation unit 106, a variable length coding unit 107, a decoding unit 108, an adder 109 and memories 110, 111.

The rearrangement memory 101 stores the moving picture inputted on a picture basis in an order of display time. The coding scheduling unit 102 rearranges each of the pictures stored in the rearrangement memory 101 into a coding order.

Figure 26:
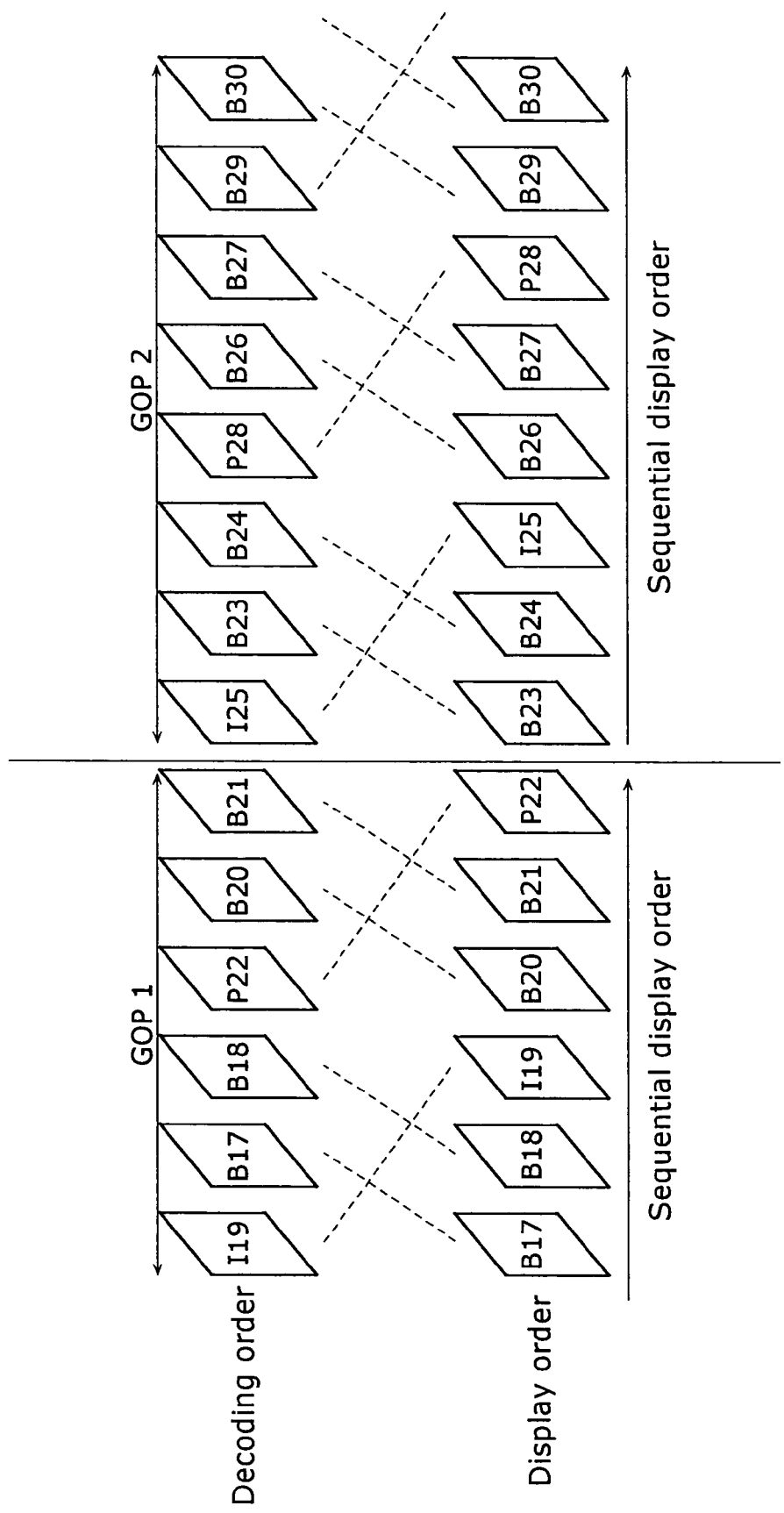
FIG. 26 is a diagram showing the concept used in the moving picture coding method according to the third embodiment of the present invention.

FIG. 26 is a diagram showing the concept used in the moving picture coding method according to the present embodiment. The present moving picture coding method, which solves the problem described in FIG. 16, stores only the pictures which are sequential in display order in a certain GOP and code the pictures in such a manner that the location in display order of arbitrary pictures included in said GOP comes before that of arbitrary pictures included in the GOP to be decoded next. By thus coding, a non-sequentiality in replay is neither generated in the GOP1 nor in the GOP2 in the case shown in FIG. 16.

Figure 27:
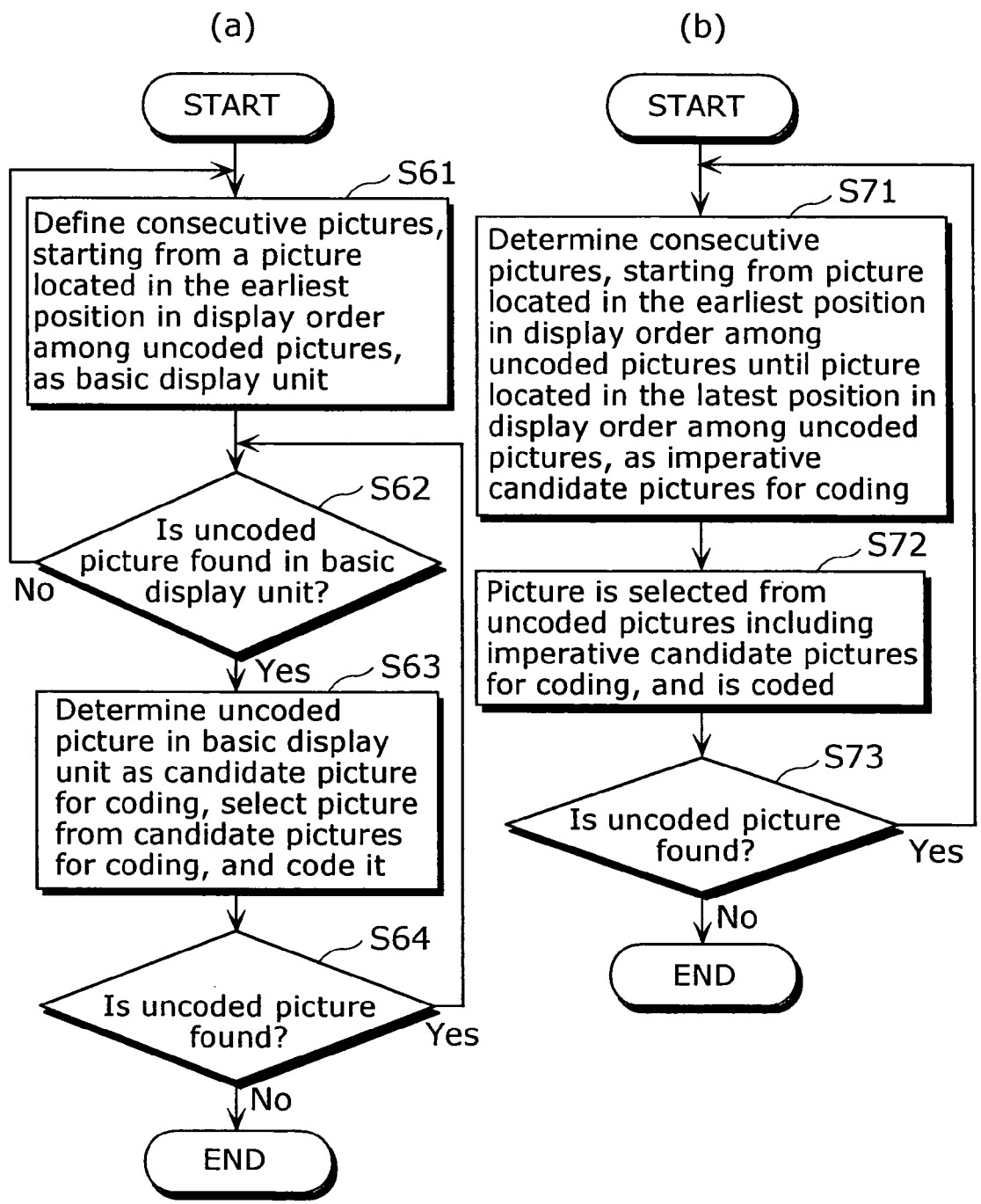
FIG. 27 is a flowchart showing the operation performed in the moving picture coding method according to the third embodiment of the present invention.

FIG. 27 is a flowchart showing the operation performed in the moving picture coding method according to the present embodiment. The processing is explained with reference to (A) in the diagram. A group of consecutive pictures starting from a picture located in the earliest position in display order among the uncoded pictures is determined as a basic display unit (Step S61). That is to say, a unit is defined as a group of more than one picture in which the pictures are sequentially arranged in display order so as not to generate the picture that is to be displayed before the basic display unit but is still not displayed. Then, whether or not an uncoded picture is found in the basic display unit is examined (Step S62). When an uncoded picture is found in the basic display unit (Yes in Step S62), the picture is determined as a candidate picture for coding and a picture selected from plural candidate pictures for coding is coded (Step S63). Whether or not an uncoded picture is still found is examined (Step S64), and when it is found, the processing proceeds to Step S62, but terminates when it is not found (No in Step S64). It should be noted that the basic display unit can be modified at an arbitrary timing as long as the following condition is satisfied: "the basic display unit includes at least the consecutive pictures starting from the picture located in the earliest position in display order among the uncoded pictures and ending at the picture located in the latest position in display order among the coded pictures".

Also, (B) shown in the diagram is a flowchart showing the operation performed in the moving picture coding method according to the present embodiment. According to this method, the consecutive pictures starting from the picture located in the earliest position in display order among the uncoded pictures and ending at the picture located in the latest position in display order among the coded pictures are regarded as imperative candidate pictures for coding (Step S71). Then, a picture is selected from the uncoded pictures including the imperative candidate pictures for coding, and is coded (Step S72). Next, whether or not an uncoded picture excepting I-pictures is found is examined (Step S73). When it is found, (Yes in Step S73), the processing proceeds to Step S71, but when it is not found (No in Step S73), the processing terminates. It should be noted that the candidate for the GOP includes the next I-picture here, but the present invention is not restricted to this. The end of the GOP may be determined, for instance, according to the description of the GOP in the file format.

Figure 16:
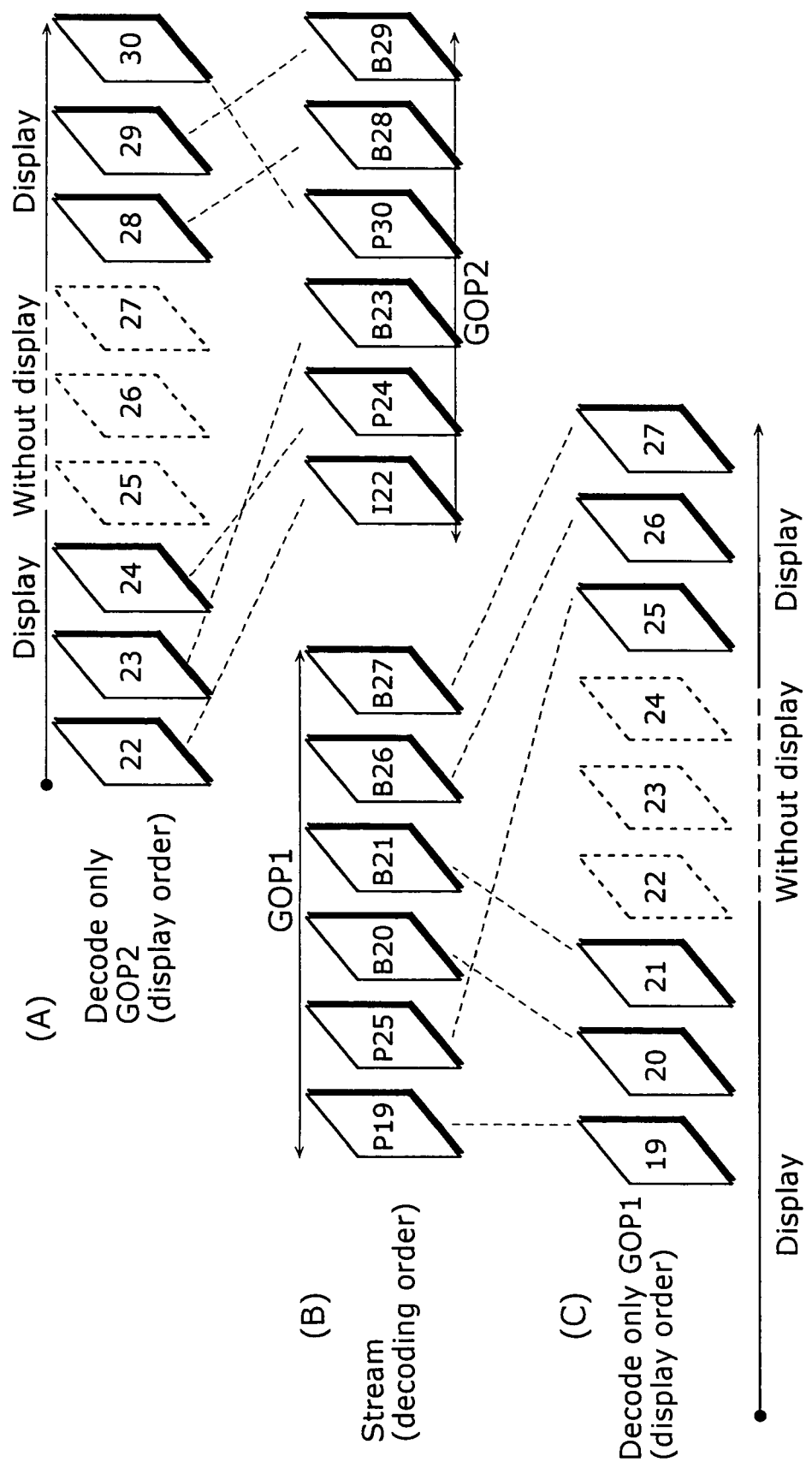
FIG. 16 is a conceptual diagram showing the problem caused by the degree of allowance in the coding defined by the JVT at the time of editing or performing random access.

Since the GOP is determined as described above, it is possible to prevent the non-sequentiality in replay from being generated respectively in the GOP1 and GOP2 as shown in the case of FIG. 16.

It should be noted that a flag, indicating that coding processing is performed, may be inserted into the coded stream, as described in the present embodiment.

Fourth Embodiment

Figure 28:
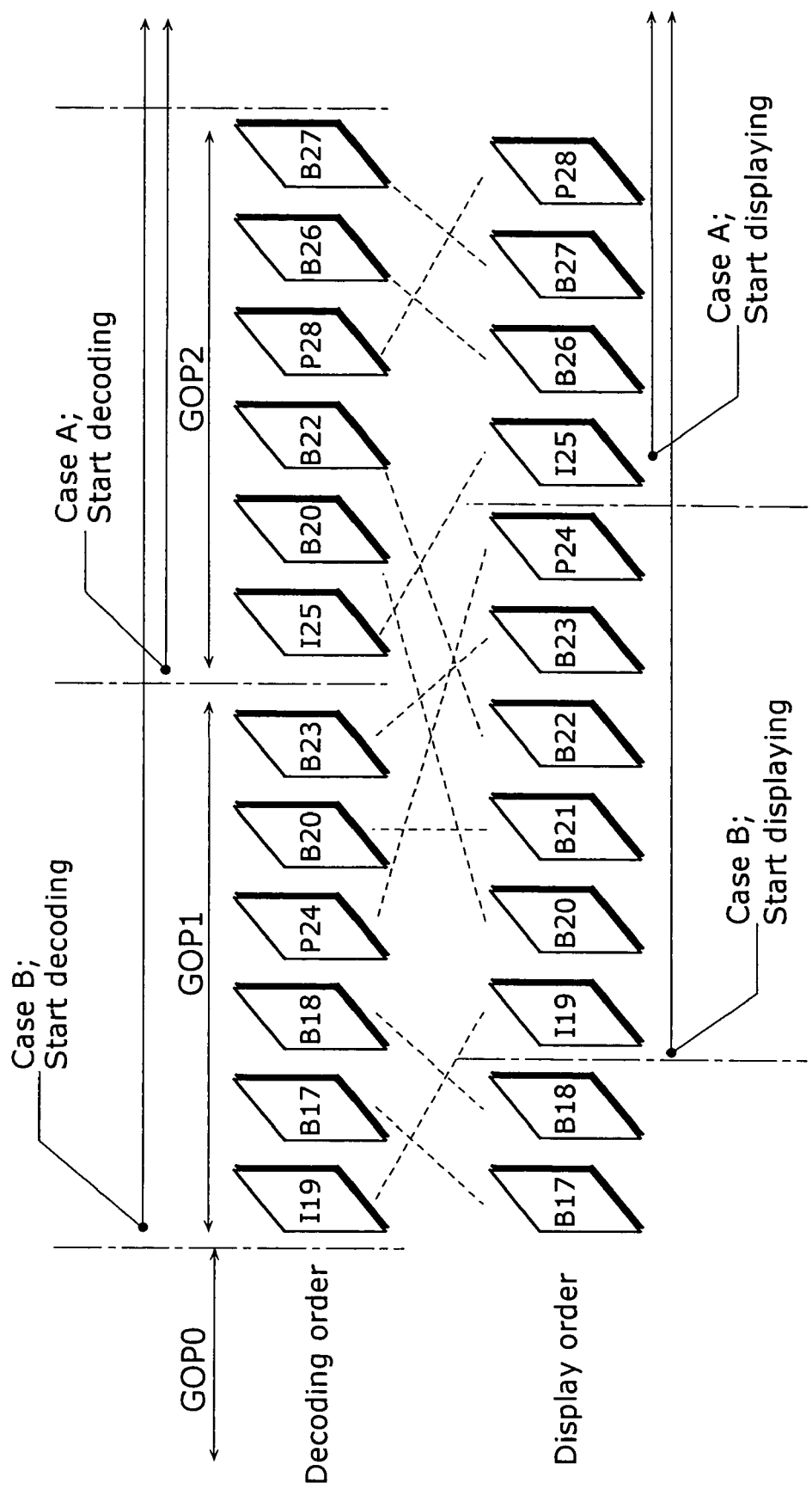
FIG. 28 is a diagram showing the concept used in the moving picture coding method according to a fourth embodiment of the present invention.

FIG. 28 is a diagram showing the concept used in the moving picture coding method according to the present embodiment. The third embodiment has shown the method to overcome simultaneously the problems generated at the time of editing as well as performing processing of random access. The present moving picture coding method, however, is a method for solving the problem generated at the time of performing random access. The present method, having fewer restrictions than the method described in the third embodiment, can improve coding efficiency.

In the present moving picture coding method, the following restrictions are defined, with the use of the example for GOP in FIG. 28:

1) pictures (B26, B27 and P28) with the display time later than that of the intra-picture (I25) within a certain GOP (GOP2) shall not be coded in such way that it is included in the GOP (GOP1) which immediately precedes said GOP including the intra-picture (GOP2). By thus controlling the coding, even when the decoding starts from the first picture (I25) included in the GOP2, all the pictures following the first picture (I25) can be displayed properly, as shown in Case A in the diagram;

(2) pictures (I19, B20, B21, B22, B23 and P24) with the display time earlier than that of the intra-picture (I25) in a certain GOP (GOP2) and also later than that of the intra-picture (I19) included in the GOP (GOP1) which immediately precedes said GOP shall be coded in such way that the pictures are included in the GOP (GOP2) or in the GOP immediately preceding said GOP (GOP1). By thus controlling the coding, even when the decoding starts from the first picture (I19) in the GOP1, all the pictures following the first picture (I19) included in the GOP1 can be displayed properly, as shown in Case B in the diagram.

In other words, 1) taking the GOP1 as an example, the picture as such to be displayed earlier than the I-picture (I25) in the following GOP is selected as the last picture to be displayed within a certain GOP, and then, is coded (namely, the picture preceding the picture P24 including the picture P24 shall be selected). 2) taking the GOP2 as an example, the first picture to be displayed within a certain GOP is selected from among the pictures as such to be displayed later than the I-picture (I19) in the immediately preceding GOP, and then, is coded (namely, the picture following the picture B20 including the picture B20 shall be selected).

That is to say, in the present moving picture coding method, the position in display order of the picture to be firstly displayed included in a certain GOP is later than that of the I-picture included in the immediately preceding GOP and the display time of the picture to be lastly displayed included in the former GOP is earlier than that of the I-picture included in the immediately following GOP. It should be noted here that the I-picture is used in the example, but the same applies to the picture that can be decoded independently.

Figure 29:
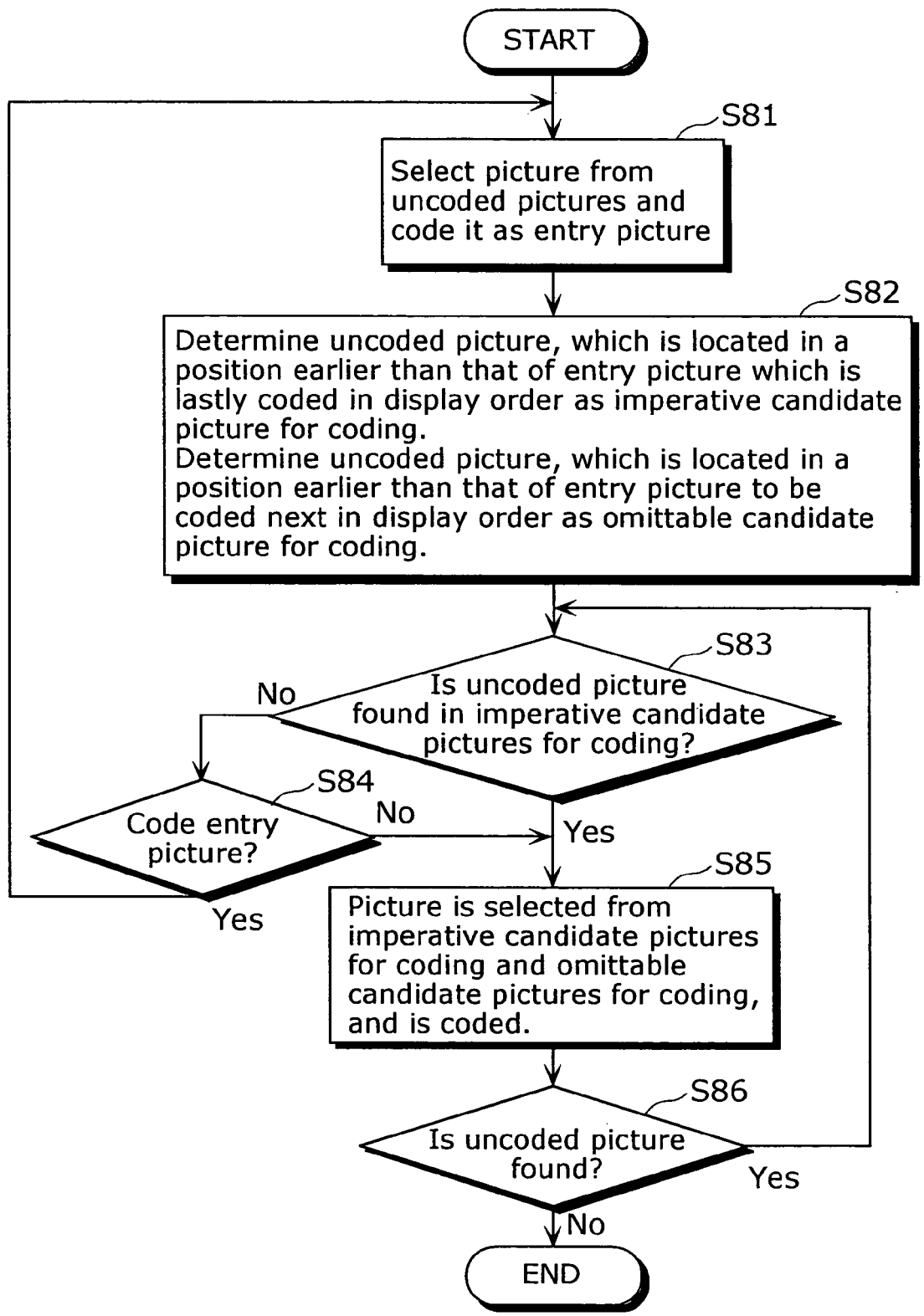
FIG. 29 is a flowchart showing the operation performed in the moving picture coding method according to the fourth embodiment of the present invention.

FIG. 29 is a flowchart showing the operation performed in the moving picture coding method according to the present embodiment. Firstly, an uncoded picture is selected and then coded as an entry picture (Step S81). The entry picture is a picture that can be decoded independently. Then, the uncoded picture in a position earlier than that of the entry picture which is coded lastly, in display order, is determined as an imperative candidate picture for coding while the uncoded picture in a position earlier than that of the entry picture to be subsequently coded, in display order, is determined as an omittable candidate picture for coding (Step S82). Then, whether or not an uncoded picture is found among the imperative candidate pictures for coding is examined (Step S83). When it is found (Yes in Step S83), a picture is selected from among the imperative candidate pictures for coding and the omittable candidate pictures for coding, and then the picture is coded (Step S85). Then, whether or not an uncoded picture is found among the candidate pictures for coding is examined again (Step S86). When it is found, the processing proceeds to Step S83, but when it is not found, the processing terminates. When an uncoded picture is not found in the imperative candidate pictures for coding (No in Step S83), whether or not to code the next entry picture is determined in Step S84. When the entry picture is coded (Yes in Step S84), the processing proceeds to Step S81 and when the entry picture is not coded (No in Step S84), the processing proceeds to Step S85.

As described above, the picture in a position later than that of the first intra picture included in the GOP is coded in such manner that the former picture is included in the GOP following said GOP. Therefore, it is possible to replay the pictures without generating the non-sequentiality in the replay even when the pictures in the GOP following a certain GOP are decoded.

As is mentioned in the present embodiment, it should be noted that the flag indicating that the coding is performed may be inserted to the coded stream.

Five Embodiment

Furthermore, the processing shown in each of the above embodiments can be carried out easily in an independent computer system by recording a program for realizing the moving picture coding/decoding methods described in each of the above embodiments onto a recording medium such as a flexible disk or the like.

FIGS. 30A, 30B and 30C are illustrations of a recording medium for recording a program for realizing the moving picture coding/decoding method described in the above embodiments in the computer system.

FIG. 30B shows a full appearance of a flexible disk, its structure at cross section and the flexible disk itself whereas FIG. 30A shows an example of a physical format of the flexible disk as a main body of a recording medium. A flexible disk FD is contained in a case F with a plurality of tracks Tr formed concentrically from the periphery to the inside on the surface of the disk, and each track is divided into 16 sectors Se in the angular direction. Thus, the moving picture coding method and the moving picture decoding method as the program are recorded in an area assigned for it on the flexible disk FD.

FIG. 30C shows a configuration for recording and reproducing the program on the flexible disk FD. When the program is recorded on the flexible disk FD, the computer system Cs writes in the moving picture coding and decoding methods as the program via a flexible disk drive FDD. When the moving picture coding and decoding methods are constructed in the computer system using the program on the flexible disk, the program is read out from the flexible disk and then transferred to the computer system by the flexible disk drive FDD.

The above explanation is made on an assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

The following is a description for the applications of the moving picture coding and decoding methods illustrated in the above-mentioned embodiments and a system using them.

Figure 31:
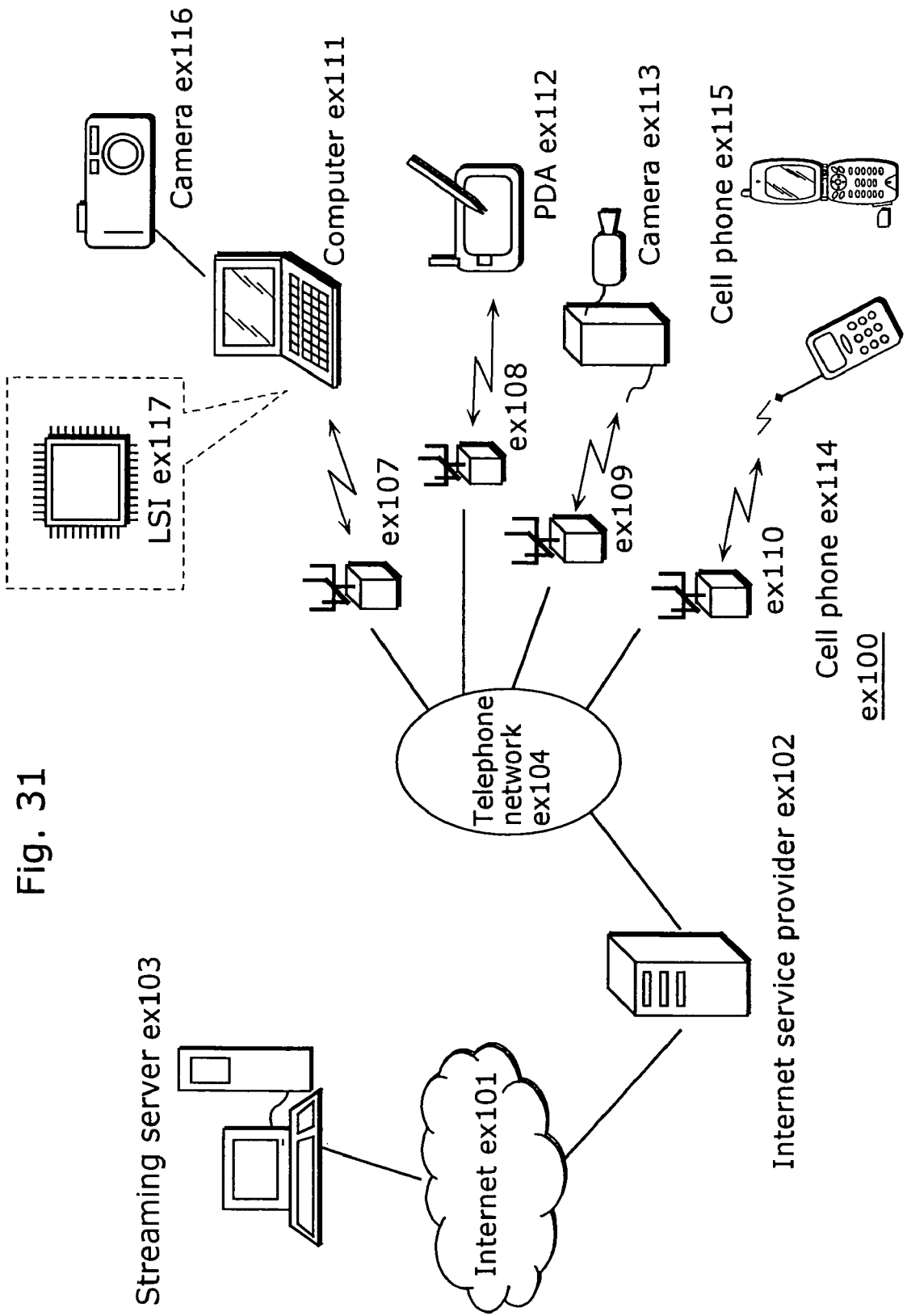
FIG. 31 is a block diagram showing the whole configuration of a content supply system, according to the fourth embodiment of the present invention, for realizing content delivery services.

FIG. 31 is a block diagram showing an overall configuration of a content supply system ex100 for realizing content delivery service. The area for providing communication service is divided into cells of desired size, and cell sites ex107~ex110, which are fixed wireless stations, are placed in respective cells.

This content supply system ex100 is connected to apparatuses such as a computer ex111, a Personal Digital Assistant (PDA) ex112, a camera ex113, a cell phone ex114 and a cell phone with a camera ex115 via, for example, Internet ex101, an Internet service provider ex102, a telephone network ex104, as well as the cell sites ex107~ex110.

However, the content supply system ex100 is not limited to the configuration shown in FIG. 31 and may be connected to a combination of any of them. Also, each apparatus may be connected directly to the telephone network ex104, not through the cell sites ex107~ex110.

The camera ex113 is an apparatus capable of shooting video such as a digital video camera. The cell phone ex114 may be a cell phone of any of the following system: a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS), or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ex111. In this case, either the camera ex116 or the computer ex111 may code the moving picture data. An LSI ex117 included in the computer ex111 and the camera ex116 performs the coding processing. Software for coding and decoding a moving picture may be integrated into any type of recording medium (such as a CD-ROM, a flexible disk and a hard disk) that is a recording medium which is readable by the computer ex115 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream delivery of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the moving picture coding apparatus or the moving picture decoding apparatus shown in the above-mentioned embodiments can be used.

A cell phone will be explained as an example of such apparatus.

Figure 32:
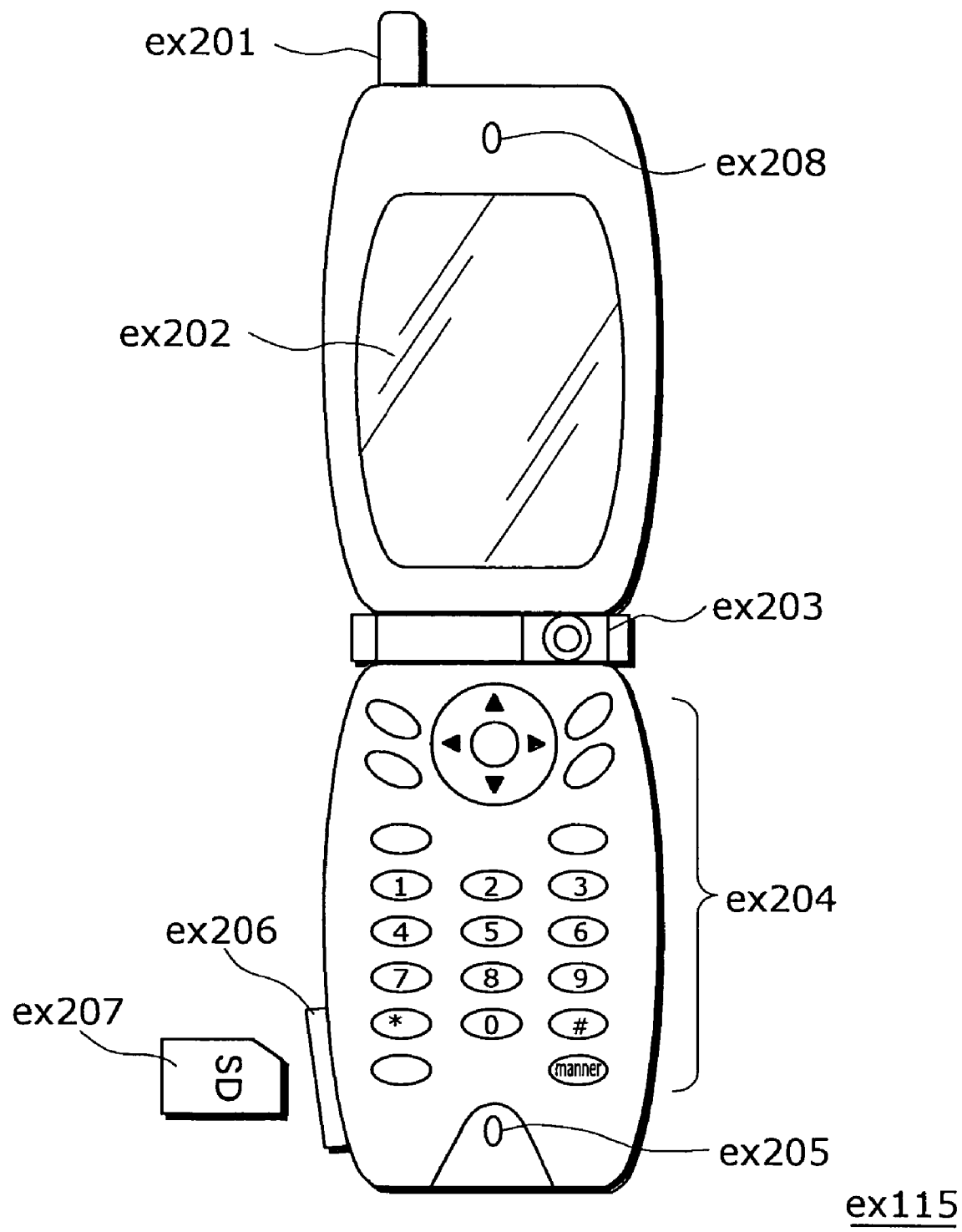
FIG. 32 is a sketch of a cell phone.

FIG. 32 is a diagram showing the cell phone ex115 using the moving picture coding and decoding methods explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, a voice output unit ex208 such as a speaker for outputting voice, a voice input unit ex205 such as a microphone for inputting voice, a recording medium ex207 for recording coded or decoded data such as data of moving or still pictures shot by the camera, data of received e-mails and that of moving or still pictures, and a slot unit ex206 for attaching the recording medium ex207 to the cell phone ex115. The recording medium ex207 stores in itself a flash memory element, a kind of Electrically Erasable and Programmable Read Only Memory (EEPROM) that is a nonvolatile memory electrically erasable from and rewritable to a plastic case such as an SD card.

Next, the cell phone ex115 will be explained with reference to FIG. 33. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, a Liquid Crystal Display (LCD) control unit ex302, a picture decoding unit ex309, a multiplexing/demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing for the digital voice data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the voice processing unit ex305 converts it into analog voice data so as to output it via the voice output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the moving picture coding apparatus as described for the present invention, compresses and codes the picture data supplied from the camera unit ex203 using the coding method employed by the moving picture coding apparatus as shown in the embodiments mentioned above so as to transform it into coded image data, and sends it out to the multiplexing/demultiplexing unit ex308. At this time, the cell phone ex115 sends out the voice received by the voice input unit ex205 during the shooting with the camera unit ex203 to the multiplexing/demultiplexing unit ex308 as digital voice data via the voice processing unit ex305.

The multiplexing/demultiplexing unit ex308 multiplexes the coded image data supplied from the picture coding unit ex312 and the voice data supplied from the voice processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a coded stream of image data and that of voice data, and supplies the coded image data to the picture decoding unit ex309 and the voice data to the voice processing unit ex305, respectively via the synchronous bus ex313.

Next, the picture decoding unit ex309, including the moving picture decoding apparatus as described in the present invention, decodes the coded stream of the image data using the decoding method corresponding to the coding method as shown in the above-mentioned embodiments to generate reproduced moving picture data, and supplies this data to the display unit ex202 via the LCD control unit ex302, and thus the image data included in the moving picture file linked to a Web page, for instance, is displayed. At the same time, the voice processing unit ex305 converts the voice data into analog voice data, and supplies this data to the voice output unit ex208, and thus the voice data included in the moving picture file linked to a Web page, for instance, is reproduced.

Figure 34:
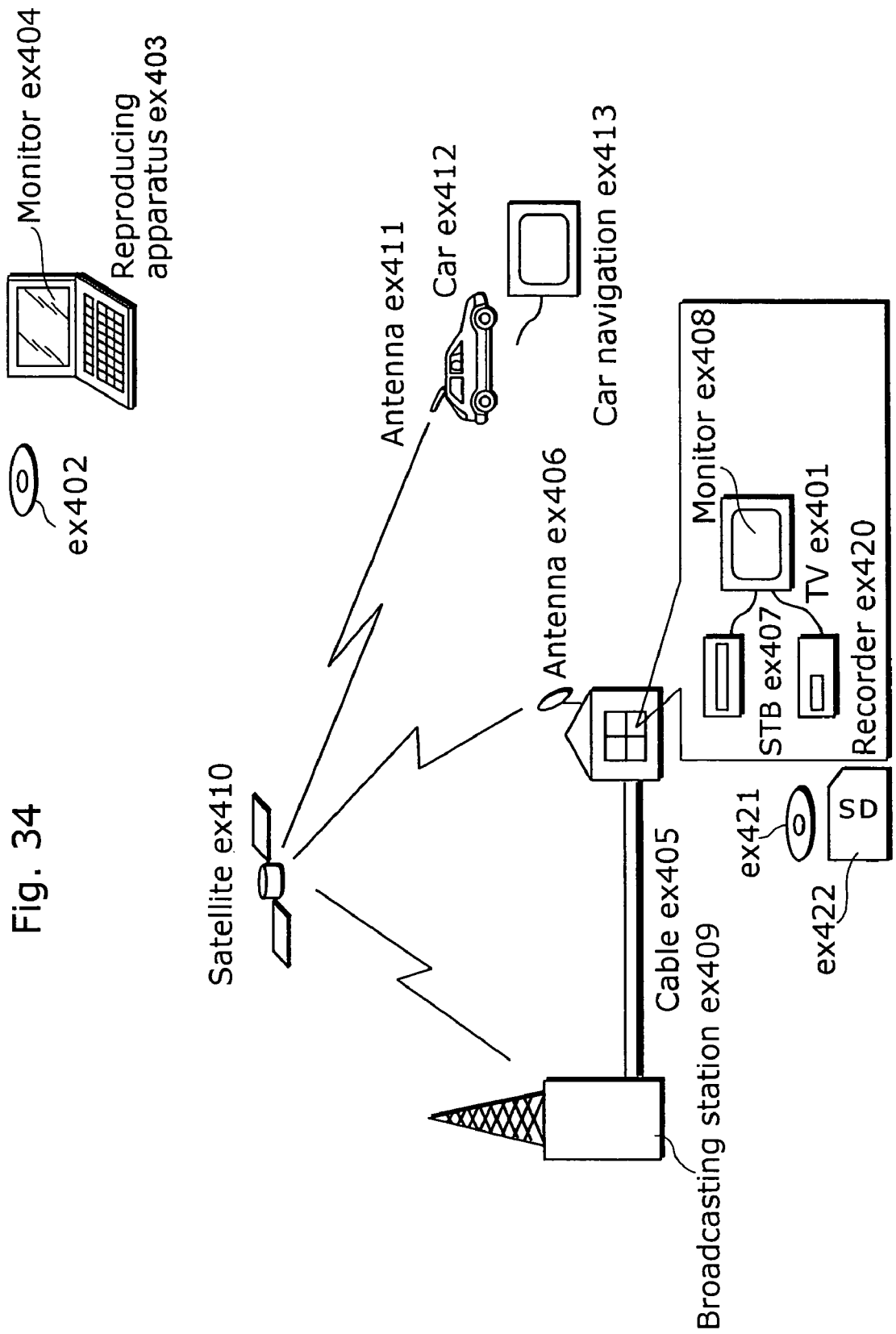
FIG. 34 is a block diagram showing the whole configuration of the digital broadcasting system.

The present invention is not limited to the above-mentioned system since ground-based or satellite digital broadcasting has been in the news lately and at least either the moving picture coding apparatus or the moving picture decoding apparatus described in the above-mentioned embodiments can be incorporated into a digital broadcasting system as shown in FIG. 34. More specifically, a coded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a Set Top Box (STB) ex407 decodes a coded bit stream for reproduction. The moving picture decoding apparatus as shown in the above-mentioned embodiments can be implemented in the reproducing apparatus ex403 for reading out and decoding the coded stream recorded on a recording medium ex402 such as a CD and a DVD. In this case, the reproduced moving picture signals are displayed on a monitor ex404. It is also conceivable to implement the moving picture decoding apparatus in the STB ex407 connected to a cable ex405 for a cable television or the antenna ex406 for satellite and/or ground-based broadcasting so as to reproduce them on a monitor ex408 of the television ex401. The moving picture decoding apparatus may be incorporated into the television, not in the Set Top Box. Also, a car ex412 having an antenna ex411 can receive signals from the satellite ex410 or the cell site ex107 for replaying a moving picture on a display device such as a car navigation system ex413 set in the car ex412.

Furthermore, the moving picture coding apparatus as shown in the above-mentioned embodiments can code picture signals and record them on the recording medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the moving picture decoding apparatus as shown in the above-mentioned embodiments, the picture signals recorded on the DVD disk ex421 or the SD card ex422 can be reproduced for display on the monitor ex408.

Figure 33:
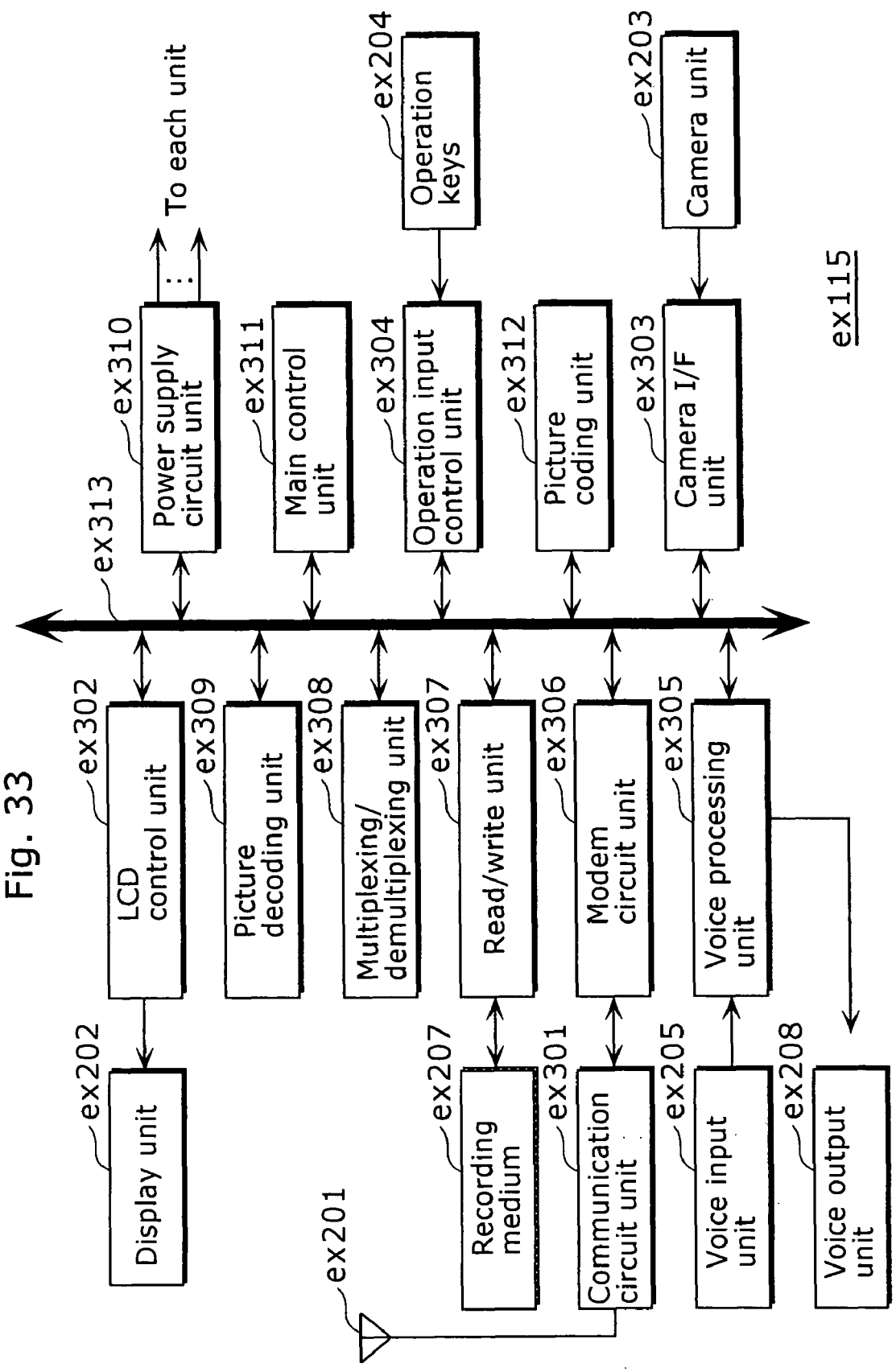
FIG. 33 is a block diagram showing the internal structure of the cell phone.

As for the structure of the car navigation system ex413, the structure without the camera unit ex203, the camera interface unit ex303 and the picture coding unit ex312, out of the components shown in FIG. 33, is conceivable. The same applies for the computer ex115, the television (receiver) ex401 and others.

In addition, three types of implementations can be conceived for a terminal such as the cell phone ex114: a sending/receiving terminal implemented with both an encoder and a decoder, a sending terminal implemented with an encoder only, and a receiving terminal implemented with a decoder only.

As described above, it is possible to use the moving picture coding and decoding methods described in the above-mentioned embodiments for any of the above-mentioned apparatuses and systems, and by using these methods, the effects described in the above-mentioned embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

Thus, the moving picture coding method and the moving picture decoding method according to the present invention are practical as methods for generating a coded stream by coding each of the pictures making up a moving picture and decoding the generated coded stream with the use of, for example, a cell phone, a DVD apparatus, a personal computer and other apparatuses.

What is claimed is:
1. A moving picture decoding method for decoding, on a picture-by-picture basis, a coded stream, wherein the coded stream includes (i) coded picture data for each picture included in the coded stream, (ii) display order information for each picture included in the coded stream, where the display order information for each picture is a picture order count (POC) and has a value indicating the display order of the respective pictures, and (iii) a flag inserted into the coded stream so as to indicate a position among the coded picture data where the values of the display order information of the pictures in the coded stream are sequential or non-sequential, where being sequential is being incremental by one and being non-sequential is a state other than being incremental by one, and wherein the flag is stored in the coded stream or in random access point information in a file system to convey the coded stream, the moving picture decoding method comprising:

an information extraction step of extracting the flag indicating a position among the coded picture data where the values of the display order information are non-sequential; and a management step of managing a storage memory area for storing a decoded picture based on the flag, wherein, when the flag is extracted in the information extraction step, a clip including unused pictures is searched, during the management step, for the decoded picture stored in the storage memory area, and a picture whose position is earliest in a display order among the unused pictures is determined as a picture to be removed.

2. The moving picture decoding method according to claim 1, further comprising an invalid picture storage step of storing an invalid picture in the storage memory area when the values of the display order information are non-sequential, wherein, in the management step, whether or not to store an invalid picture in the area is determined based on the flag and the display order information, and wherein, in the invalid picture storage step, an invalid picture is stored in the storage memory area based on a result of the determination made in the management step.

3. A moving picture decoding apparatus for decoding, on a picture-by-picture basis, a coded stream, wherein the coded stream includes (i) coded picture data for each picture included in the coded stream, (ii) display order information for each picture included in the coded stream, where the display order information for each picture is a picture order count (POC) and has a value indicating the display order of the respective pictures, and (iii) a flag inserted into the coded stream so as to indicate a position among the coded picture data where the values of the display order information of the pictures in the coded stream are sequential or non-sequential, where being sequential is being incremental by one and being non-sequential is a state other than being incremental by one, and wherein the flag is stored in the coded stream or in random access point information in a file system to convey the coded stream, the moving picture decoding apparatus comprising:

an information extraction unit operable to extract the flag indicating a position among the coded picture data where the values of the display order information of the pictures are non-sequential; and a management unit operable to manage a storage memory area for storing a decoded picture based on the flag, wherein, when the flag is extracted by the information extraction unit, the management unit searches a clip including unused pictures for the decoded picture stored in the storage memory area, and determines, as a picture to be removed, a picture whose position is earliest in a display order among the unused pictures.

4. A non-transitory computer readable recording medium encoded with a computer program for decoding, on a picture-by-picture basis, a coded stream, wherein the coded stream includes (i) coded picture data for each picture included in the coded stream, (ii) display order information for each picture included in the coded stream, where the display order information for each picture is a picture order count (POC) and has a value indicating the display order of the respective pictures, and (iii) a flag inserted into the coded stream so as to indicate a position among the coded picture data where the values of the display order information of the pictures in the coded stream are sequential or non-sequential, where being sequential is being incremental by one and being non-sequential is a state other than being incremental by one, wherein the flag is stored in the coded stream or in random access point information in a file system to convey the coded stream, and wherein, when executed, the computer program causes a computer to perform a method comprising:

an information extraction step of extracting the flag indicating a position among the coded picture data where the values of the display order information of the pictures are non-sequential; and a management step of managing a storage memory area for storing a decoded picture based on the flag, wherein, when the flag is extracted in the information extraction step, a clip including unused pictures is searched, during the management step, for the decoded picture stored in the storage memory area, and a picture whose position is earliest in a display order among the unused pictures is determined as a picture to be removed.

5. A moving picture coding method for coding an inputted coded moving picture signal on a picture-by-picture basis and generating a coded stream, wherein the inputted coded moving picture signal includes (i) coded picture data for each picture, and (ii) display order information for each picture, where the display order information for each picture is a picture order count (POC) and has a value indicating the display order of the respective pictures, the moving picture coding method comprising:

a detecting step of detecting whether the values of the display order information for the pictures to be included in the generated coded stream are sequential or non-sequential, where being sequential is being incremental by one and being non-sequential is a state other than being incremental by one;

a flag information generation step of generating a flag indicating that the values of the display order information are non-sequential, when said detecting step detects that the values of the display order information for the pictures to be included in the generated coded stream are non-sequential; and a coded stream generating step of (1) generating a coded stream including: (i) the coded picture data for each picture to be included in the generated coded stream; and (ii) the flag inserted into the coded stream so as to indicate a position among the coded picture data where the display order of the pictures is non-sequential, or (2) generating a coded stream including: (i) predetermined coding unit and a further coding unit such that the predetermined coding unit includes a plurality of picture data of respective pictures to be included in the generated coded stream, including a first intra picture, and such that the further coding unit is located after the predetermined coding unit and includes picture data of a picture whose display order is later than a display order of the first intra picture among the pictures included in the predetermined coding unit; and (ii) the flag inserted into the coded stream so as to indicate a position among the coded picture data where the display order of the pictures is non-sequential, wherein, in the coded stream generating step, the flag is inserted between two pictures in the generated coded stream, said two pictures being non-sequential in display order.

6. The moving picture coding method according to claim 5, wherein, in the coded stream generating step, the coded stream is generated (i) such that a display order of pictures in the predetermined coding unit is sequential, and (ii) such that the display order of the pictures in said predetermined coding unit is located earlier than a display order of pictures in a predetermined coding unit immediately following said predetermined coding unit.

7. The moving picture coding method according to claim 5, wherein the flag is stored in supplemental enhancement information (SEI) for storing additional information, the SEI being located between clips in the generated coded stream.

8. A moving picture coding apparatus for coding an inputted coded moving picture signal on a picture-by-picture basis and generating a coded stream, wherein the inputted coded moving picture signal includes (i) coded picture data for each picture, and (ii) display order information for each picture, where the display order information for each picture is a picture order count (POC) and has a value indicating the display order of the respective pictures, the moving picture coding apparatus comprising:

a detecting unit operable to detect whether the values of the display order information for the pictures to be included in the generated coded stream are sequential or non-sequential, where being sequential is being incremental by one and being non-sequential is a state other than being incremental by one;

a flag information generation unit operable to generate a flag indicating that the values of the display order information are non-sequential when said detecting unit detects that the values of the display order information for the pictures to be included in the generated coded stream are non-sequential; and a coded stream generating unit operable to (1) generate a coded stream including: (i) the coded picture data for each picture to be included in the generated coded stream; and (ii) the flag inserted into the coded stream so as to indicate a position among the coded picture data where the display order of the pictures is non-sequential, or (2) generating a coded stream including: (i) predetermined coding unit and a further coding unit such that the predetermined coding unit includes a plurality of picture data of respective pictures to be included in the generated coded stream, including a first intra picture, and such that the further coding unit is located after the predetermined coding unit and includes picture data of a picture whose display order is later than a display order of the first intra picture among the pictures included in the predetermined coding unit; and (ii) the flag inserted into the coded stream so as to indicate a position among the coded picture data where the display order of the pictures is non-sequential, wherein, in the coded stream generating unit, the flag is inserted between two pictures in the generated coded stream, said two pictures being non-sequential in display order.

9. A non-transitory computer readable recording medium encoded with a computer program for coding an inputted original coded moving picture signal on a picture-by-picture basis and generating a coded stream, wherein the inputted original coded moving picture signal includes (i) coded picture data for each picture, and (ii) display order information for each picture, where the display order information for each picture is a picture order count (POC) and has a value indicating the display order of the respective pictures, and wherein, when executed, the computer program causes a computer to perform a method comprising:

a detecting step of detecting whether the values of the display order information for the pictures to be included in the generated coded stream are sequential or non-sequential, where being sequential is being incremental by one and being non-sequential is a state other than being incremental by one;

a flag information generation step of generating a flag indicating that the values of the display order information are non-sequential when said detecting step detects that the values of the display order information for the pictures to be included in the generated coded stream are non-sequential; and a coded stream generating step of (1) generating a coded stream including: (i) the coded picture data for each picture to be included in the generated coded stream; and (ii) the flag inserted into the coded stream so as to indicate a position among the coded picture data where the display order of the pictures is non-sequential, or (2) generating a coded stream including: (i) a predetermined coding unit and a further coding unit such that the predetermined coding unit includes a plurality of picture data of respective pictures to be included in the generated coded stream, including a first intra picture, and such that the further coding unit is located after the predetermined coding unit and includes picture data of a picture whose display order is later than a display order of the first intra picture among the pictures included in the predetermined coding unit; and (ii) the flag inserted into the coded stream so as to indicate a position among the coded picture data where the display order of the pictures is non-sequential, wherein, in the coded stream generating step, the flag is inserted between two pictures in the generated coded stream, said two pictures being non-sequential in display order.

* * * * *